United States Patent
Levien et al.

(10) Patent No.: US 9,776,716 B2
(45) Date of Patent: Oct. 3, 2017

(54) UNOCCUPIED FLYING VEHICLE (UFV) INTER-VEHICLE COMMUNICATION FOR HAZARD HANDLING

(71) Applicant: Elwha LLC, a limited liability corporation of the State of Delaware, Bellevue, WA (US)

(72) Inventors: Royce A. Levien, Lexington, MA (US); Robert W. Lord, Seattle, WA (US); Richard T. Lord, Tacoma, WA (US); Mark A. Malamud, Seattle, WA (US); John D. Rinaldo, Jr., Bellevue, WA (US); Lowell L. Wood, Jr., Bellevue, WA (US)

(73) Assignee: Elwah LLC, Bellevue, WA (US)

( * ) Notice: Subject to any disclaimer, the term of this patent is extended or adjusted under 35 U.S.C. 154(b) by 201 days.

(21) Appl. No.: 13/722,874

(22) Filed: Dec. 20, 2012

(65) Prior Publication Data
US 2014/0249692 A1    Sep. 4, 2014

Related U.S. Application Data

(63) Continuation-in-part of application No. 13/720,694, filed on Dec. 19, 2012.

(51) Int. Cl.
| | |
|---|---|
| G06F 17/10 | (2006.01) |
| G06G 7/78 | (2006.01) |
| G08G 1/16 | (2006.01) |
| B64C 39/02 | (2006.01) |
| G05D 1/10 | (2006.01) |

(52) U.S. Cl.
CPC .......... *B64C 39/024* (2013.01); *G05D 1/104* (2013.01); *B64C 2201/143* (2013.01)

(58) Field of Classification Search
CPC .......... B64C 19/00; G05D 1/101; G08G 5/04; G08G 5/45
USPC ............................................. 701/3, 300–302
See application file for complete search history.

(56) References Cited

U.S. PATENT DOCUMENTS

| | | | |
|---|---|---|---|
| 4,964,837 | A | 10/1990 | Collier |
| 5,581,250 | A | 12/1996 | Khvilivitzky |
| 6,786,213 | B1 | 9/2004 | Lee |
| 6,804,607 | B1 | 10/2004 | Wood |
| 6,896,220 | B2 | 5/2005 | McKendree et al. |
| 6,926,233 | B1 * | 8/2005 | Corcoran, III .......... B64C 13/20 244/76 R |
| 6,952,001 | B2 | 10/2005 | McKendree et al. |

(Continued)

OTHER PUBLICATIONS

"A Swarm of Nano Quadrotors ", YouTube.com, http://www.youtube.com/watch?v=YQIMGV5vtd4, Jan. 31, 2012.

(Continued)

*Primary Examiner* — Imran Mustafa

(57) ABSTRACT

Disclosed herein are example embodiments for unoccupied flying vehicle (UFV) inter-vehicle communication for hazard handling. For certain example embodiments, at least one machine may: (i) receive one or more flight attributes from a remote UFV, with the one or more flight attributes indicative of one or more flight capabilities of the remote UFV; or (ii) adjust a flight path of a UFV based at least partially on one or more flight attributes received from a remote UFV. However, claimed subject matter is not limited to any particular described embodiments, implementations, examples, or so forth.

33 Claims, 20 Drawing Sheets

(56) References Cited

U.S. PATENT DOCUMENTS

| | | | |
|---|---|---|---|
| 7,024,309 B2 | 4/2006 | Doane | |
| 7,437,225 B1 | 10/2008 | Rathinam | |
| 7,542,828 B2 | 6/2009 | Steele et al. | |
| 7,693,624 B2 | 4/2010 | Duggan et al. | |
| 7,737,878 B2 | 6/2010 | van Tooren et al. | |
| 7,747,364 B2 | 6/2010 | Roy et al. | |
| 7,876,258 B2 | 1/2011 | Abraham et al. | |
| 7,953,524 B1 | 5/2011 | Roggendorf | |
| 7,969,346 B2 | 6/2011 | Franceschini et al. | |
| 8,060,270 B2 | 11/2011 | Vian et al. | |
| 8,068,949 B2 | 11/2011 | Duggan et al. | |
| 8,086,351 B2 | 12/2011 | Gaudiano et al. | |
| 8,103,398 B2 | 1/2012 | Duggan et al. | |
| 8,380,367 B2 | 2/2013 | Schultz et al. | |
| 8,471,186 B2 | 6/2013 | Wallis | |
| 8,700,306 B2 | 4/2014 | Duggan et al. | |
| 2001/0044444 A1 | 11/2001 | Mahe et al. | |
| 2003/0014165 A1* | 1/2003 | Baker | G05D 1/107 701/3 |
| 2003/0135762 A1 | 7/2003 | Macaulay | |
| 2004/0193334 A1 | 9/2004 | Carlsson et al. | |
| 2004/0249519 A1 | 12/2004 | Frink | |
| 2005/0004723 A1 | 1/2005 | Duggan et al. | |
| 2005/0090945 A1 | 4/2005 | Bodin et al. | |
| 2005/0136891 A1 | 6/2005 | Wang et al. | |
| 2005/0197749 A1* | 9/2005 | Nichols | G05D 1/0202 701/3 |
| 2006/0058928 A1 | 3/2006 | Beard et al. | |
| 2006/0058931 A1 | 3/2006 | Ariyur et al. | |
| 2006/0167596 A1 | 7/2006 | Bodin et al. | |
| 2006/0238414 A1 | 10/2006 | Miyamoto et al. | |
| 2006/0249622 A1 | 11/2006 | Steele | |
| 2006/0271248 A1 | 11/2006 | Cosgrove et al. | |
| 2006/0287824 A1 | 12/2006 | Lin | |
| 2007/0021879 A1* | 1/2007 | DelNero | G05D 1/0088 701/23 |
| 2007/0106473 A1 | 5/2007 | Bodin et al. | |
| 2007/0152814 A1 | 7/2007 | Stefani | |
| 2007/0210953 A1 | 9/2007 | Abraham et al. | |
| 2008/0033604 A1 | 2/2008 | Margolin | |
| 2008/0055149 A1 | 3/2008 | Rees et al. | |
| 2008/0125933 A1 | 5/2008 | Williams et al. | |
| 2008/0190274 A1 | 8/2008 | Kirkpatrick | |
| 2008/0249669 A1 | 10/2008 | Skarman | |
| 2008/0255711 A1 | 10/2008 | Matos | |
| 2009/0027253 A1 | 1/2009 | Van Tooren et al. | |
| 2009/0102630 A1 | 4/2009 | Nordlund et al. | |
| 2009/0118896 A1* | 5/2009 | Gustafsson | G05D 1/104 701/31.4 |
| 2009/0125221 A1 | 5/2009 | Estkowski et al. | |
| 2009/0134981 A1 | 5/2009 | Shafaat et al. | |
| 2009/0210109 A1 | 8/2009 | Ravenscroft | |
| 2009/0212157 A1 | 8/2009 | Arlton et al. | |
| 2009/0222148 A1 | 9/2009 | Knotts et al. | |
| 2009/0318138 A1 | 12/2009 | Zeng et al. | |
| 2009/0319100 A1* | 12/2009 | Kale | G08G 5/0013 701/4 |
| 2010/0004798 A1 | 1/2010 | Bodin et al. | |
| 2010/0049376 A1 | 2/2010 | Schultz | |
| 2010/0094481 A1* | 4/2010 | Anderson | G05D 1/0088 701/1 |
| 2010/0094499 A1 | 4/2010 | Anderson | |
| 2010/0094981 A1 | 4/2010 | Cordray et al. | |
| 2010/0100269 A1 | 4/2010 | Ekhaguere et al. | |
| 2010/0121574 A1* | 5/2010 | Ariyur | G05D 1/101 701/301 |
| 2010/0127923 A1 | 5/2010 | Harper et al. | |
| 2010/0131121 A1 | 5/2010 | Gerlock | |
| 2010/0163621 A1 | 7/2010 | Ben-Asher et al. | |
| 2010/0198514 A1 | 8/2010 | Miralles | |
| 2010/0204867 A1 | 8/2010 | Longstaff | |
| 2010/0224732 A1 | 9/2010 | Olson et al. | |
| 2010/0302359 A1 | 12/2010 | Adams et al. | |
| 2010/0332136 A1 | 12/2010 | Duggan et al. | |
| 2011/0035149 A1 | 2/2011 | McAndrew et al. | |
| 2011/0118907 A1 | 5/2011 | Elkins | |
| 2011/0118981 A1 | 5/2011 | Chamlou | |
| 2011/0134249 A1 | 6/2011 | Wood et al. | |
| 2011/0169943 A1 | 7/2011 | Bachman, II et al. | |
| 2012/0022719 A1 | 1/2012 | Matos | |
| 2012/0083947 A1 | 4/2012 | Anderson et al. | |
| 2012/0089274 A1 | 4/2012 | Lee et al. | |
| 2012/0092208 A1 | 4/2012 | LeMire et al. | |
| 2012/0106800 A1 | 5/2012 | Khan et al. | |
| 2012/0123628 A1 | 5/2012 | Duggan et al. | |
| 2012/0143482 A1 | 6/2012 | Gossen et al. | |
| 2012/0167207 A1 | 6/2012 | Beckley et al. | |
| 2012/0187243 A1 | 7/2012 | Goldie et al. | |
| 2012/0200404 A1 | 8/2012 | Morris | |
| 2012/0210853 A1 | 8/2012 | Abershitz et al. | |
| 2012/0221168 A1 | 8/2012 | Zeng et al. | |
| 2012/0296497 A1 | 11/2012 | Lee et al. | |
| 2013/0131976 A1 | 5/2013 | Hubbard et al. | |
| 2013/0197734 A1 | 8/2013 | Okura | |
| 2013/0197739 A1 | 8/2013 | Gallagher et al. | |
| 2013/0211656 A1 | 8/2013 | An et al. | |
| 2014/0142787 A1 | 5/2014 | Tillotson et al. | |
| 2014/0156109 A1 | 6/2014 | Estkowski | |

OTHER PUBLICATIONS

"Collision Avoidance—Where We Are: Detect See and Avoid versus See and Avoid", UAV MarketSpace Developing Commercial UAV Applications, http://www.uavm.com/uavregulatory/collisionavoidance.html, Dec. 5, 2012, pp. 1-5.

"Drone Hijacking? That's Just the Start of GPS Troubles", Danger Room Wired.com, http://www.wired.com/dangerroom/2012/07/drone-hijacking/all/, Jan. 11, 2013, pp. 1-4.

"Most U.S. Drones Openly Broadcast Secret Video Feeds", Danger Room Wired.com, http://www.wired.com/dangerroom/2012/10/hack-proof-drone, Jan. 11, 2013, pp. 1-4.

"Pentagon Looks to Fix 'Pervasive Vulnerability' in Drones", Danger Room Wired.com, http://www.wired.com/dangerroom/2012/12/darpa-drones/, Jan. 11, 2013, pp. 1-5.

"Robot Quadrotors Perform James Bond Theme", YouTube.com, http://www.youtube.com/watch?vs=sUeGc-8dyk, Feb. 28, 2012.

"Unmanned aerial vehicle", Wikipedia, http://en.wikipedia.org/wiki/Unmanned_aerial_vehicle, Dec. 3, 2012, pp. 1-21.

"Vijay Kumar: Robots that fly . . . and cooperate", TED.com; http://www.ted.com/talks/vjay_kumar_robots_that_fly_and_cooperate.htm, Mar. 2012.

Albaker; Rahim; "Autonomous unmanned aircraft collision avoidance system based on geometric intersection", International Journal of the Physical Sciences, Feb. 4, 2011, vol. 6, pp. 391-401.

Anderson, Chris; "How I Accidentally Kickstarted the Domestic Drone Boom", Danger Room Wired.com, http://www.wired.com/dangerroom/2012/06/ff_drones/all/, Dec. 6, 2012, pp. 1-10.

Bai; Hsu; Kochenderfer; Lee; "Unmanned Aircraft Collision Avoidance using Continuous-State POMDPs", National University of Singapore School of Computing;, https://www1.comp.nus.edu.sg/~leews/publications/rss11.pdf, Dec. 3, 2012.

Dean, Stephen; "Drone crashes into SWAT team tank during police test near Houston", Examiner.com, http://www.examiner.com/page-one-in-houston/drone-crashes-into-swat-team-tank-during-police-test-near-houston, Mar. 20, 2012, pp. 1-4.

Federal Aviation Administration; DOT Regs 14-CFR-91 Subchapter-F Subpart-B Flight Rules; Dec. 15, 2013 pp. 711-738.

Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.

Gruen, Armin; "First Civilian Photogrammetric UAV Flight Over Singapore", Sensors & Systems, http://sensorsandsystems.com/article/features/26474-first-civilian-photogrammetric-uav-flig, Mar. 26, 2012; pp. 1-7.

Leopold, George; "U.S. to begin testing future drones", EE Times, http://www.eetimes.com/General/PrintView/4237809, Mar. 9, 2012, pp. 1.

(56) References Cited

OTHER PUBLICATIONS

Montgomery; Johnson; Roumeliotis; Matthies; "The JPL Autonomous Helicopter Testbed: A Platform for Planetary Exploration Technology Research and Development", Journal of Field Robotics, vol. 23(3), Dec. 3, 2012, Wiley Periodicals, Inc.

Subbaraman, Nidhi; "Drones over America: How unmanned fliers are already helping cops", NBC News.com, http://www.nbcnews.com/technology/drones-over-america-how-unmanned-fliers-are-already-helping-cops-1C9135554, Mar. 30, 201, pp. 1-5.

Zarzhitsky, Dimitri V.; "Physic-Based Approach to Chemical Source Localization Using Mobile Robotic Swarms"; a dissertation submitted to the Department of Computer Science and The Graduate School of The University of Wymoing; bearing a date of Aug. 2008; pp. 1-299; ProQuest LLC, UMI Microform 3338814; Ann Arbor, Michigan.

\* cited by examiner

UNOCCUPIED FLYING VEHICLE (UFV) 102

REMOTE UFV 102R

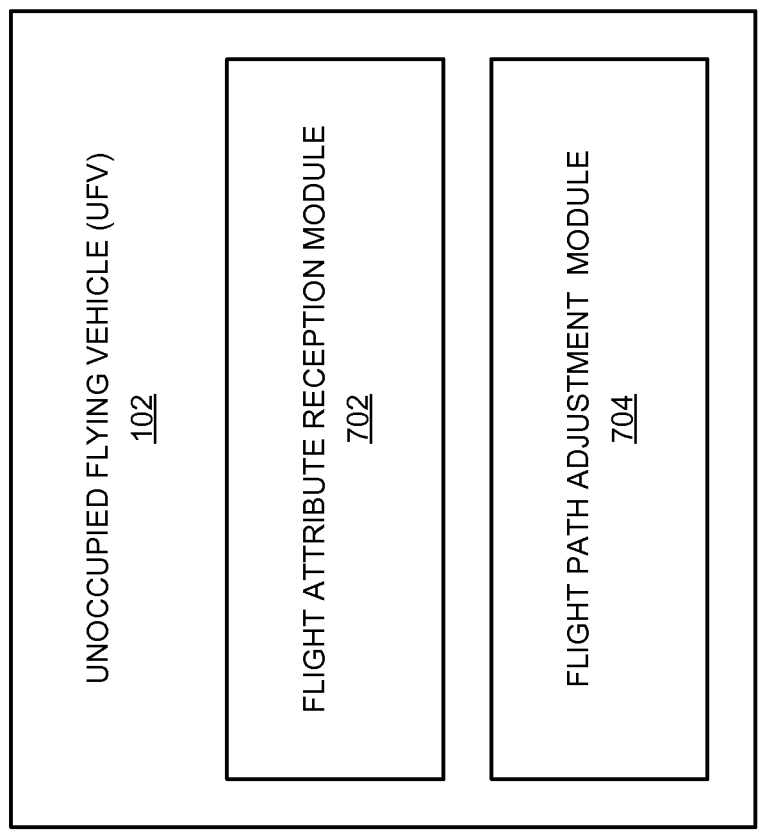

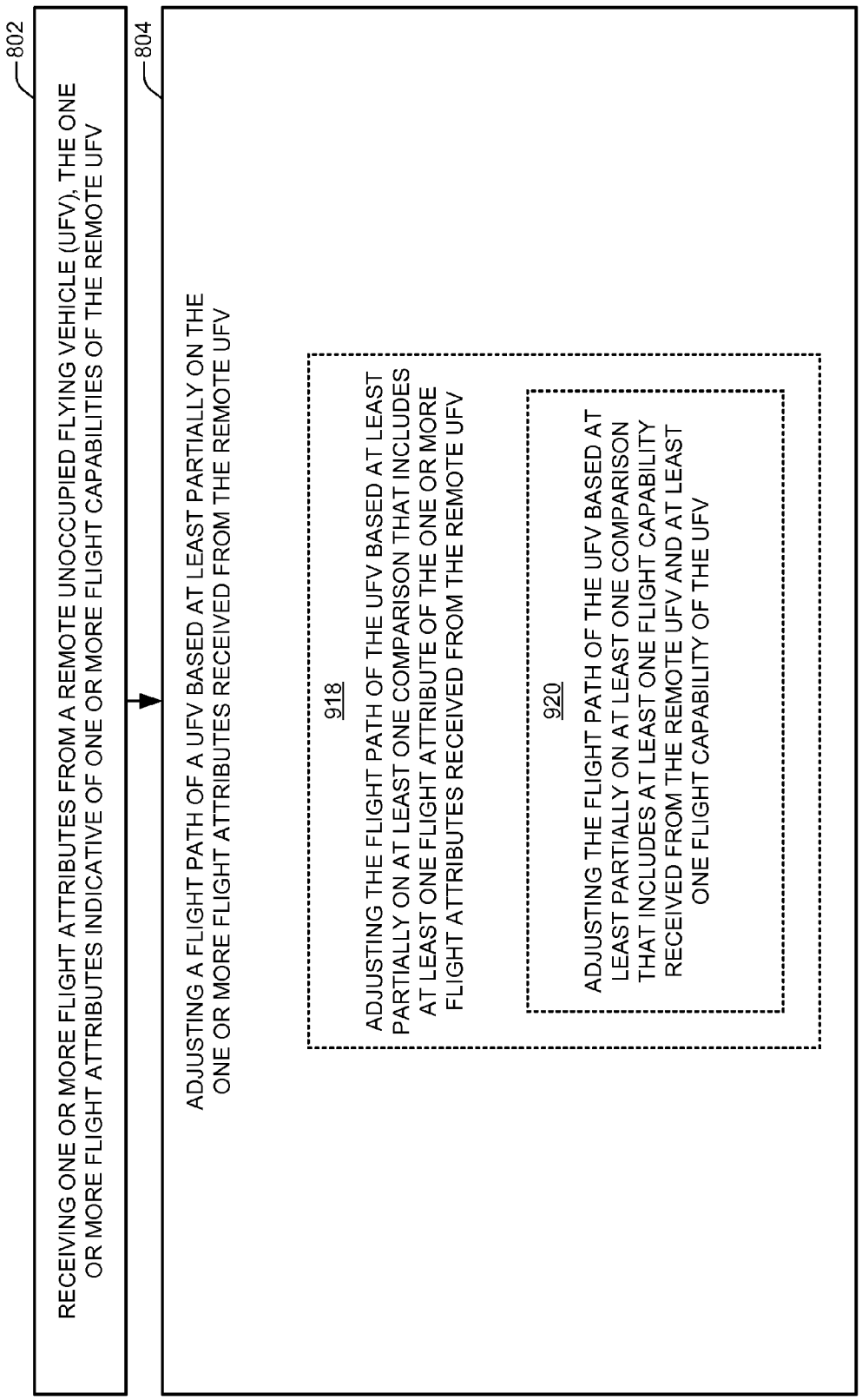

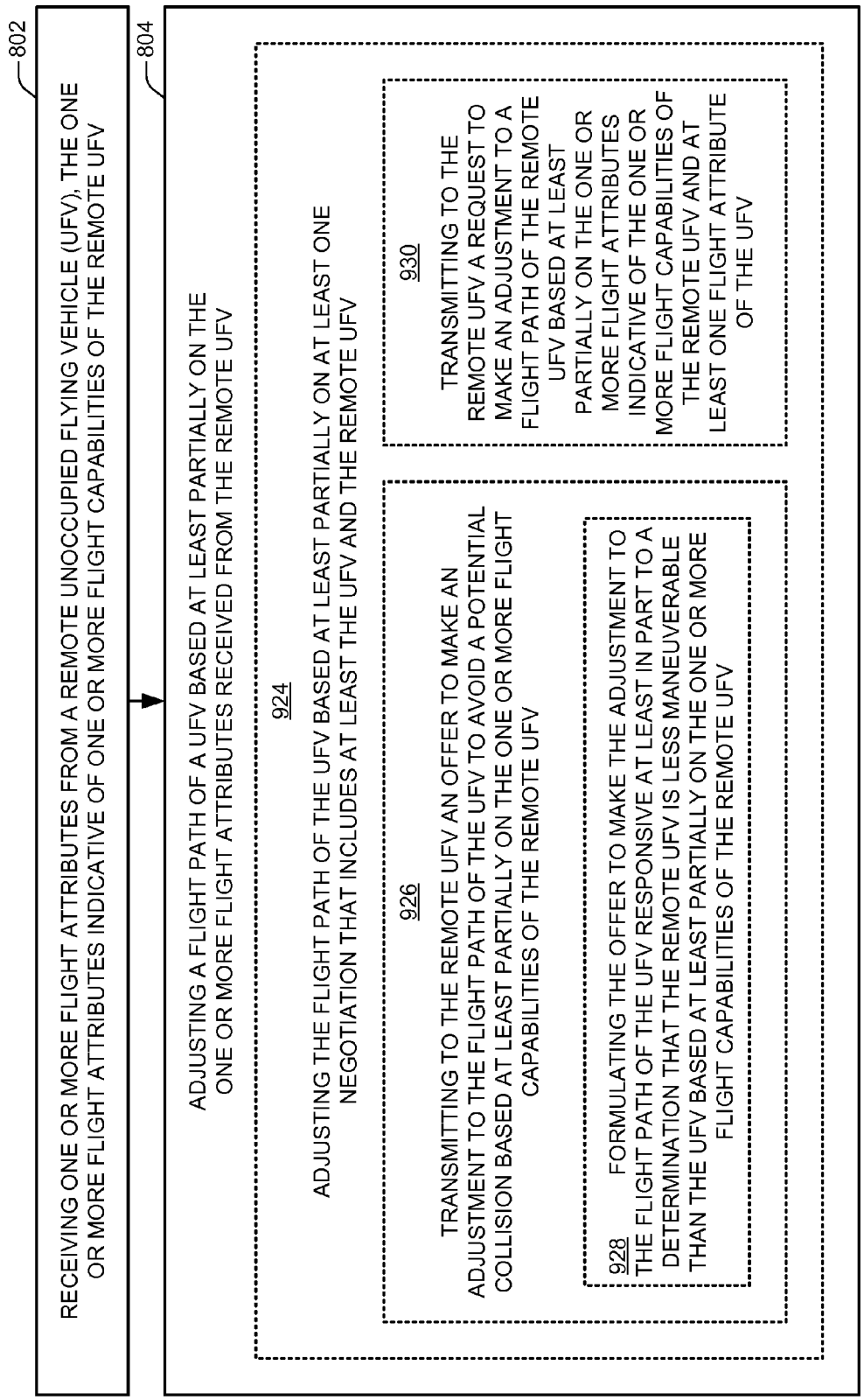

UNOCCUPIED FLYING VEHICLE (UFV) INTER-VEHICLE COMMUNICATION FOR HAZARD HANDLING

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720,694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 1 is a schematic diagram of at least one unoccupied flying vehicle (UFV) in accordance with certain example embodiments.

FIG. 7A is a schematic diagram that includes at least one example machine, such as an unoccupied flying vehicle (UFV), that is capable of addressing scenarios for UFV inter-vehicle communication for hazard handling in accordance with certain example embodiments.

FIGS. 9A-9C depict example additions or alternatives for a flow diagram of FIG. 8A in accordance with certain example embodiments.

DETAILED DESCRIPTION

Figure 2:
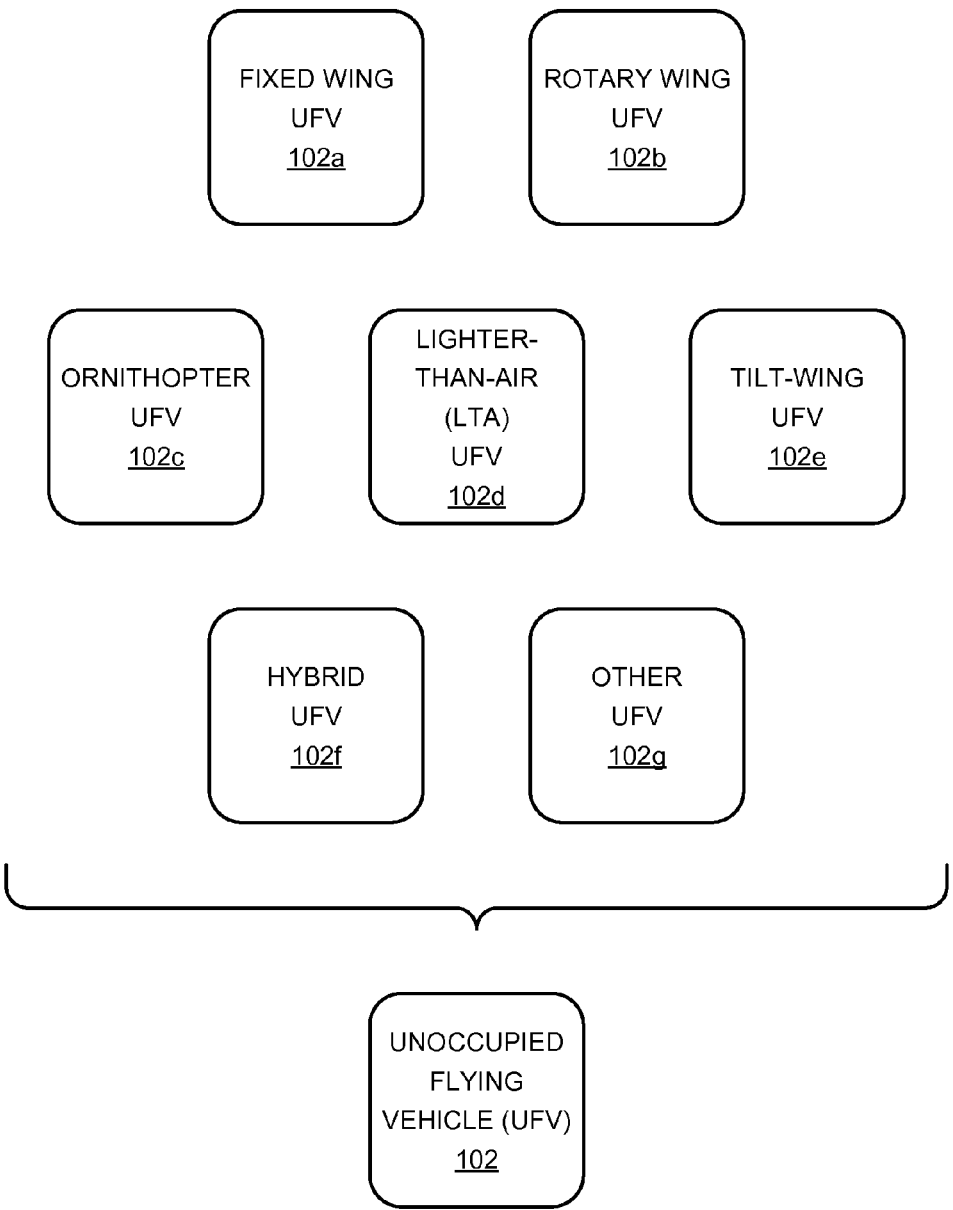
FIG. 2 is a schematic diagram of example realizations for at least one UFV in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an unmanned-aircraft vehicle system (UAVS), an unmanned aircraft system (UAS), a small unmanned air system (sUAS), a combination thereof, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102b, such as a helicopter or a gyrodyne. Third, a UFV 102 may be realized as an ornithopter UFV 102c, such as small craft that has flapping wings like an animal (e.g., like a dragonfly, bee, bird, or bat, etc.). Fourth, a UFV 102 may be realized as an LTA UFV 102d, such as a blimp, a balloon, or a dirigible. Fifth, a UFV 102 may be realized as a tilt-wing UFV 102e, such as a propeller-driven airplane with wings that rotate at least during vertical takeoff or landing. Sixth, a UFV 102 may be realized as a hybrid UFV 102f that combines one or more capabilities or structural characteristics of at least one fixed wing UFV 102a, at least one rotary wing UFV 102b, at least one ornithopter UFV 102c, at least one LTA UFV 102d, at least one tilt-wing UFV 102e, or at least one other UFV 102g. Seventh, a UFV 102 may be realized as an other type of UFV 102g, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3A:
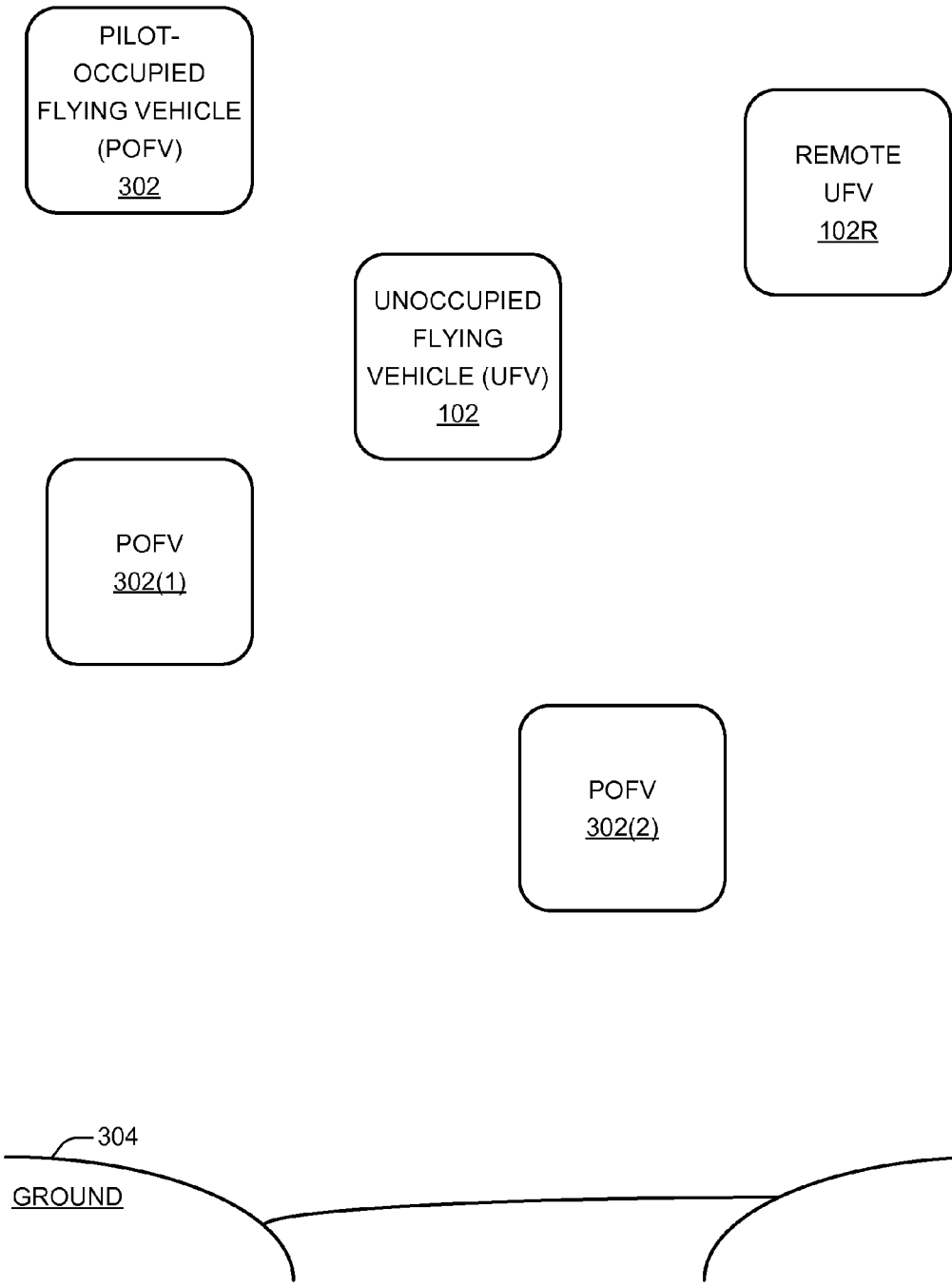
FIGS. 3A-3C are schematic diagrams of example UFV hazard handling scenarios or environments in accordance with certain example embodiments.
Figure 3B:
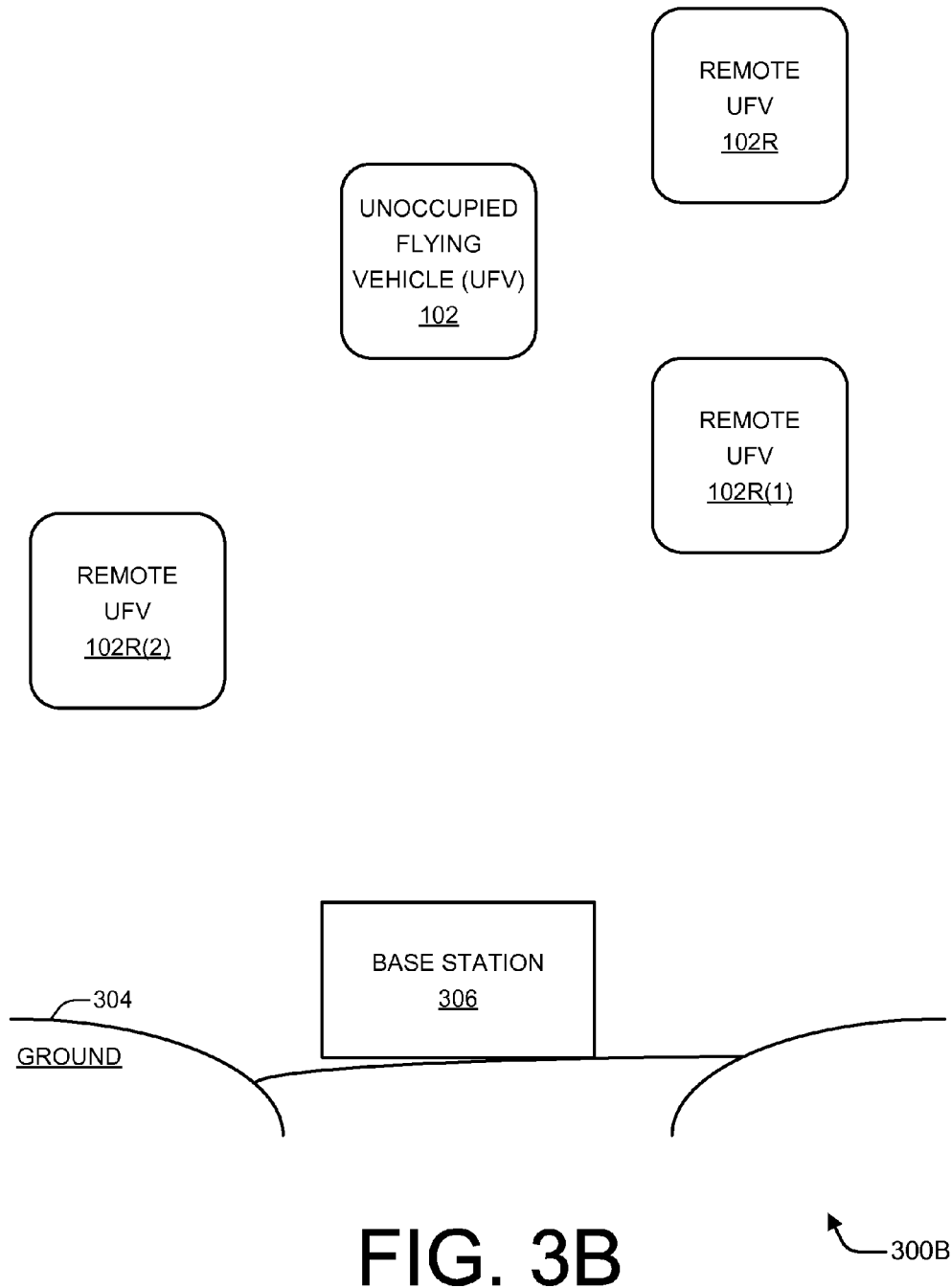
Figure 3C:
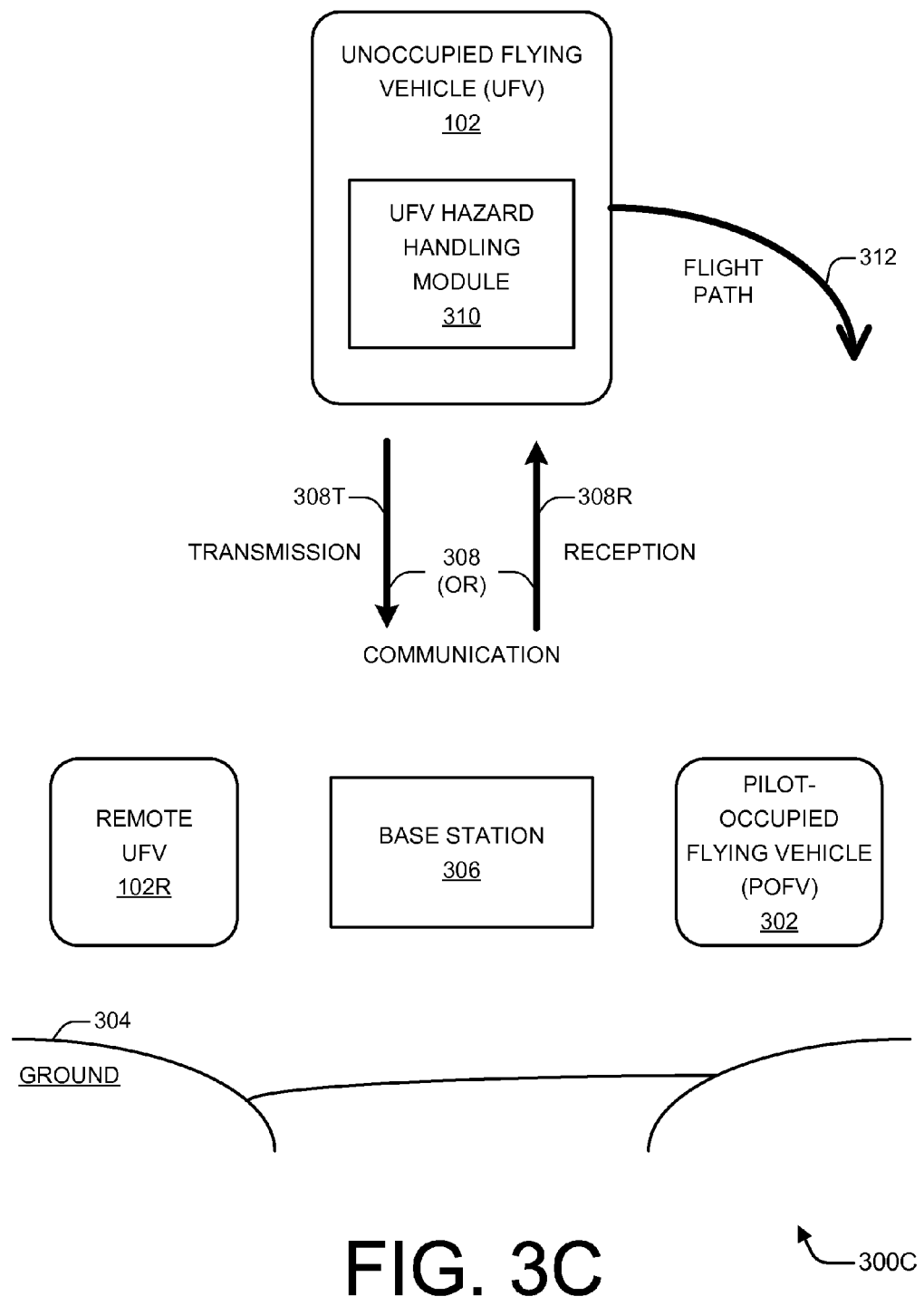

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may engage in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
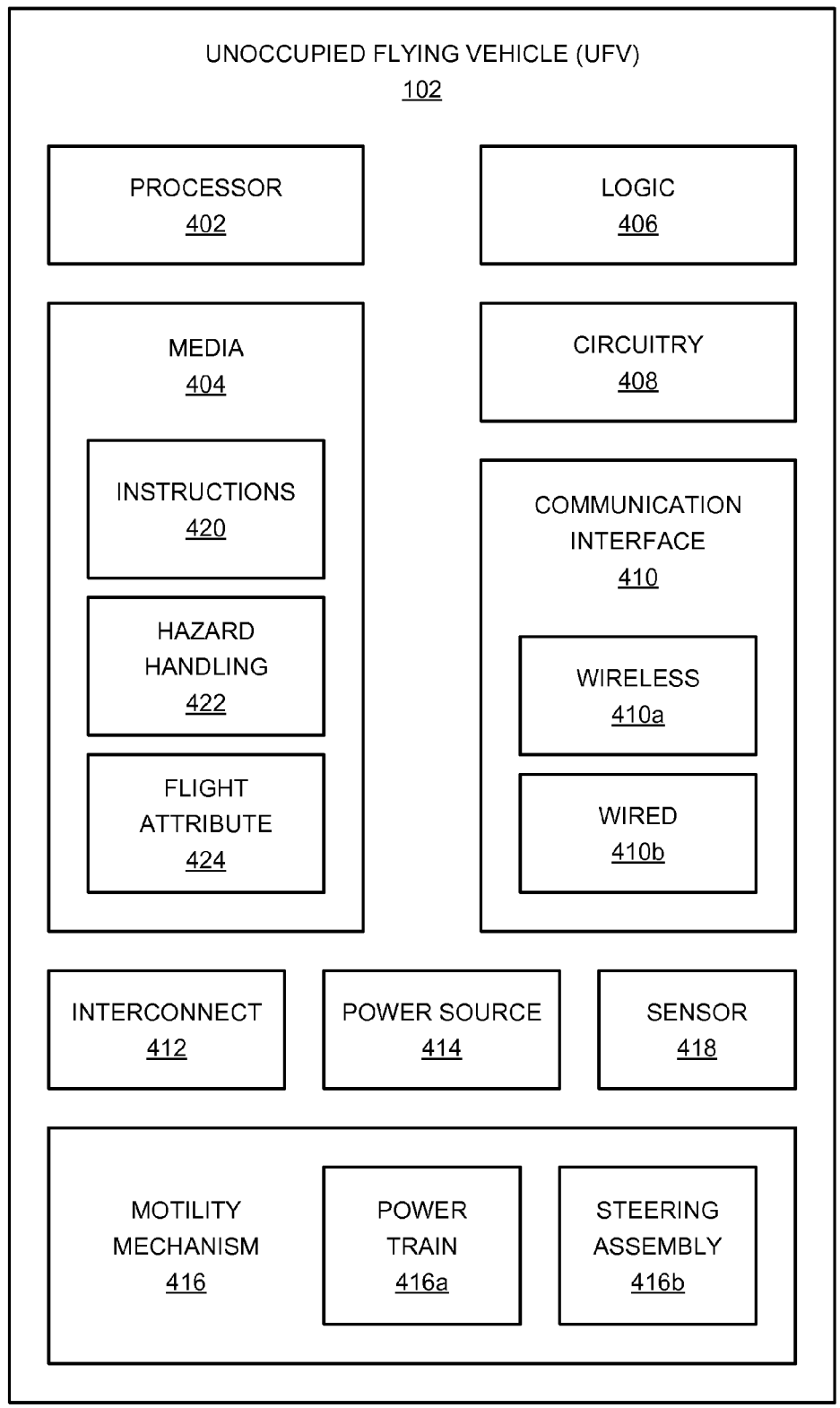
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410*a*, at least one wired communication interface 410*b*, some combination thereof, or so forth; or a motility mechanism 416 may include at least one power train 416*a*, at least one steering assembly 416*b*, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus, platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard. A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410*a* or a wired communication interface 410*b* may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410a or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
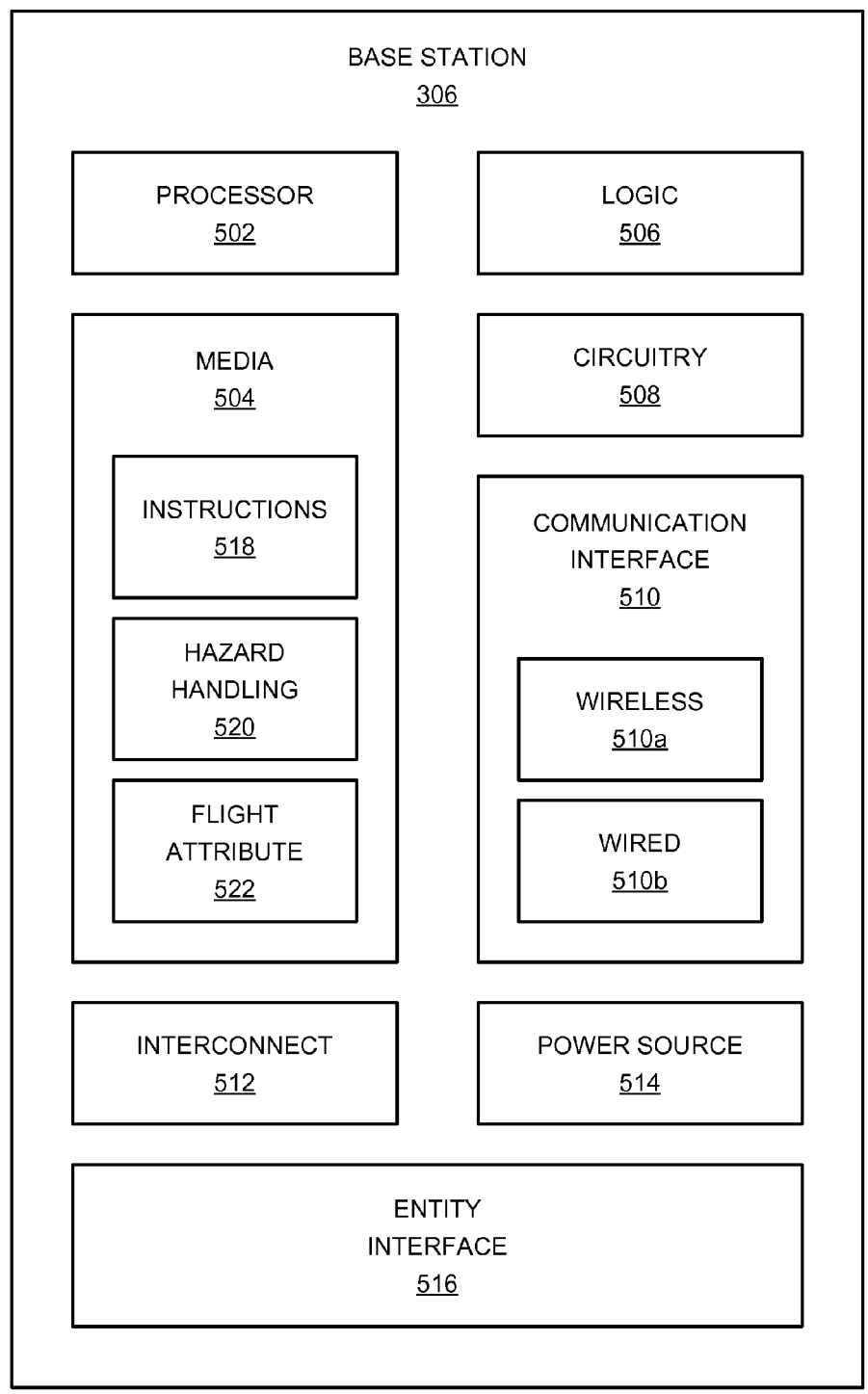
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510a, at least one wired communication interface 510b, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

Figure 6:
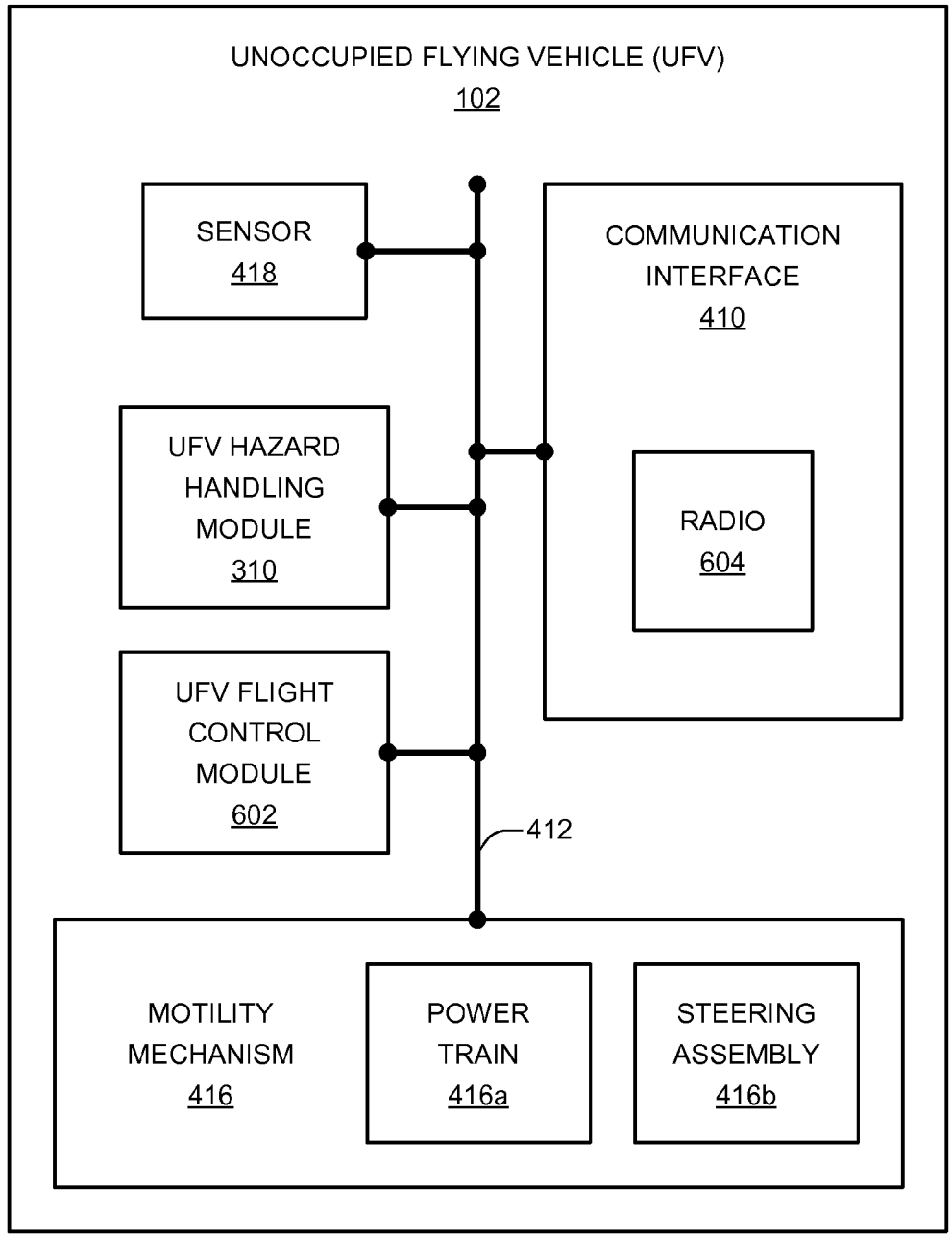
FIG. 6 is a schematic diagram of an example UFV that has one or more functional modules or one or more operational components in accordance with certain example embodiments.

FIG. 6 is a schematic diagram 600 of an example UFV that has one or more functional modules or one or more operational components in accordance with certain example embodiments. As shown in FIG. 6, example UFV 102 of schematic diagram 600 may include, by way of example but not limitation, at least one UFV hazard handling module 310, at least one communication interface 410, at least one interconnect 412, at least one motility mechanism 416, one or more sensors 418, or at least one UFV flight control module 602. More specifically, communication interface 410 may include at least one radio 604, or so forth; or motility mechanism 416 may include at least one power train 416a, at least one steering assembly 416b, some combination thereof, or so forth. However, a UFV 102 may alternatively include more, fewer, or different module(s) or component(s) from those that are illustrated without departing from claimed subject matter.

For certain example embodiments, a UFV hazard handling module 310 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310 and UFV flight control module 602 are illustrated separately in schematic diagram 600, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 310, as at least part of UFV flight control module 602, some combination thereof, or so forth. However, claimed subject matter is not limited to any particular described embodiments, implementations, examples, etc.

For certain example embodiments, a module may include or be comprised of at least one processor (e.g., a processor 402 of FIG. 4, a processor 502 of FIG. 5, etc.), one or more media (e.g., a medium 404 of FIG. 4, a media medium 504 of FIG. 5, etc.), executable instructions (e.g., processor-executable instructions, instructions 420 of FIG. 4, instructions 518 of FIG. 5, computer-implementable instructions, etc.) incorporated into one or more media, logic (e.g., logic 406 of FIG. 4, logic 506 of FIG. 5, etc.), circuitry (e.g., circuitry 408 of FIG. 4, circuitry 508 of FIG. 5, etc.), other described or illustrated component(s), may be comprised as otherwise described herein, some combination thereof, or so forth. For certain example implementations, one or more modules (e.g., a UFV hazard handling module 310, a UFV flight control module 602, or a combination thereof, etc.) of at least one UFV 102 may function or interoperate with one or more modules of at least one remote UFV 102R, at least one POFV 302, at least one base station 306 (e.g., each of FIGS. 3A-3C), or a combination thereof, etc. via at least one radio 604 of UFV 102. However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via radio 604. One or more sensors 418 or radio 604 may feed sensor readings, telemetry, flight attributes, a combination thereof, etc. to UFV hazard handling module 310, UFV flight control module 602, a combination thereof, or so forth. For certain example implementations, UFV hazard handling module 310 may at least make hazard-related flight control decisions or provide flight control input to UFV flight control module 602 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. Additionally or alternatively, a UFV hazard handling module 310 may supply flight control input, including by way of example but not limitation with at least one flight control command, directly (e.g., without routing it first through UFV flight control module 602) to motility mechanism 416. To implement flight control decisions, including flight control commands, motility mechanism 416 may employ power train 416a to provide at least one propulsive force or may employ steering assembly 416b to provide at least one directional change. However, claimed subject matter is not limited to any particular described embodiments, implementations, examples, etc.

FIG. 7A is a schematic diagram 700A that includes at least one example machine, such as an unoccupied flying vehicle (UFV), that is capable of addressing scenarios for UFV inter-vehicle communication for hazard handling in accordance with certain example embodiments. As shown in FIG. 7A, by way of example but not limitation, schematic diagram 700A includes at least one machine that may include a flight attribute reception module 702 or a flight path adjustment module 704. More specifically, schematic diagram 700A may include a machine that includes or comprises at least one UFV 102. By way of example but not limitation, a flight attribute reception module 702 or a flight path adjustment module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, a flight attribute reception module 702 or a flight path adjustment module 704 may be implemented separately or at least partially jointly or in combination. For certain example implementations, a flight attribute reception module 702 may be configured to receive one or more flight attributes from a remote UFV, with the one or more flight attributes indicative of one or more flight capabilities of the remote UFV. For certain example implementations, a flight path adjustment module 704 may be configured to adjust a flight path of a UFV based at least partially on one or more flight attributes received from a remote UFV. However, claimed subject matter is not limited to any particular described embodiments, implementations, examples, etc.

Figure 7B:
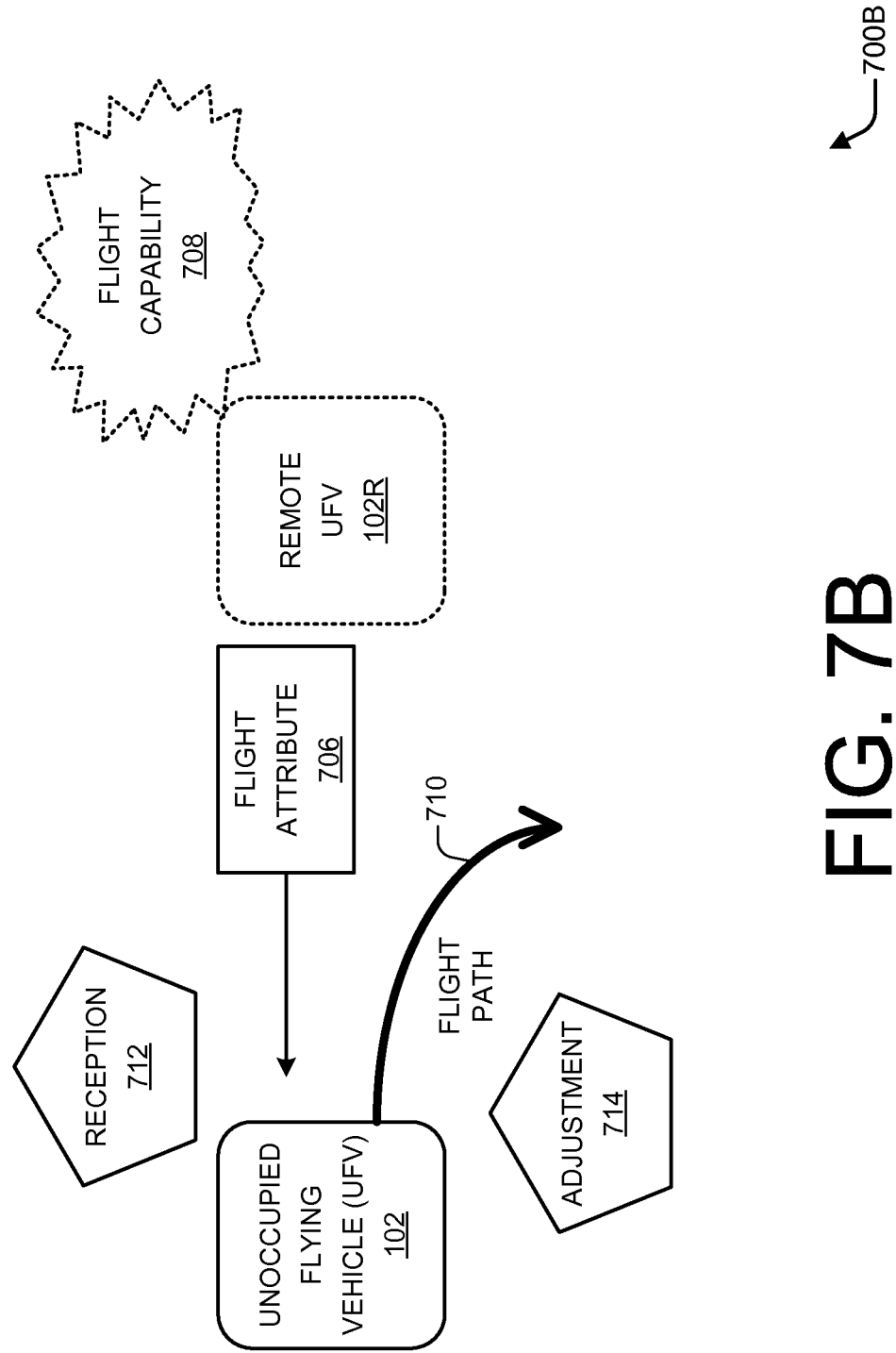
FIGS. 7B-7D are schematic diagrams that include at least one example machine and that depict example scenarios for implementing UFV inter-vehicle communication for hazard handling in accordance with certain example embodiments.
Figure 7C:
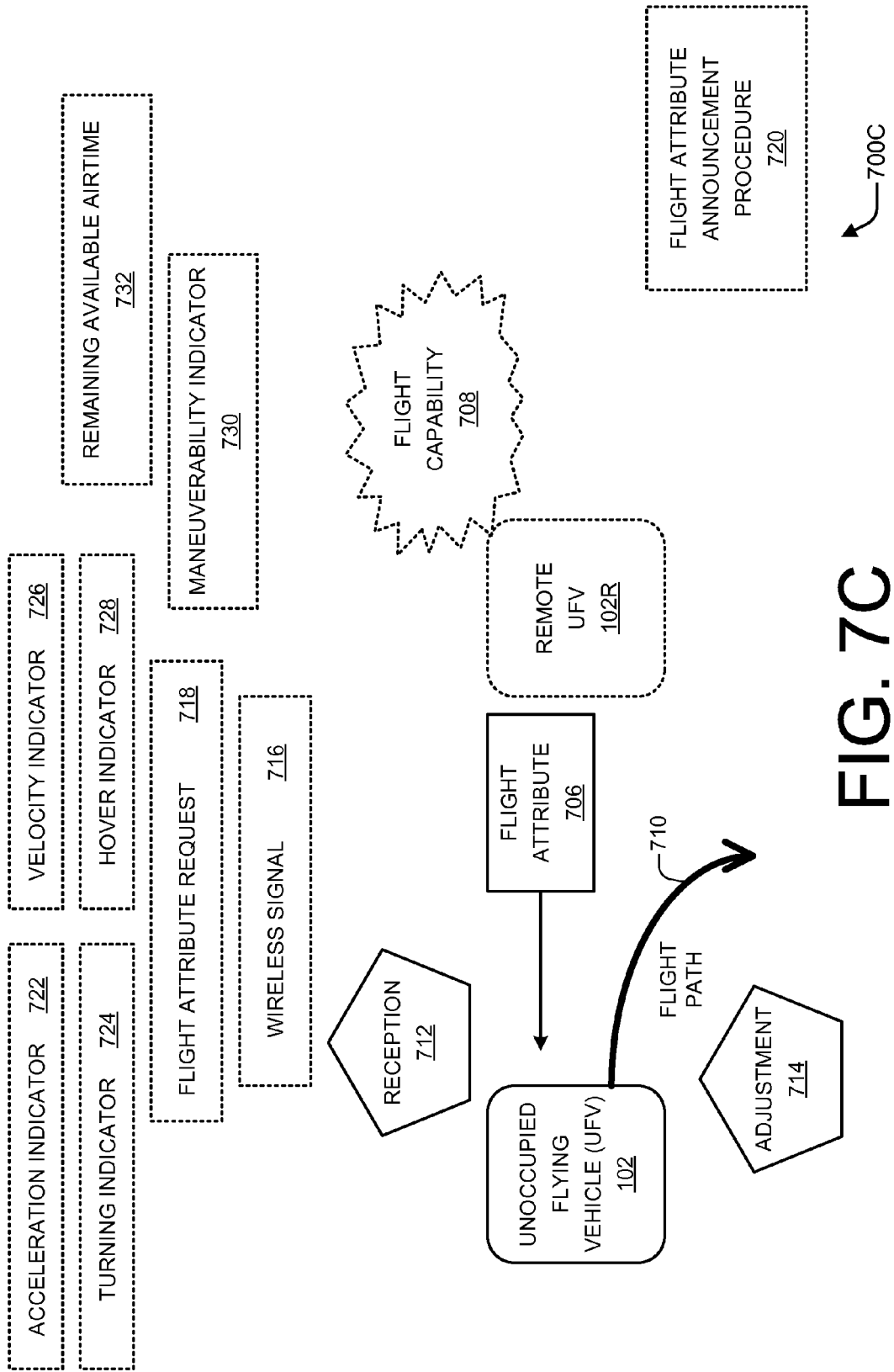
Figure 7D:
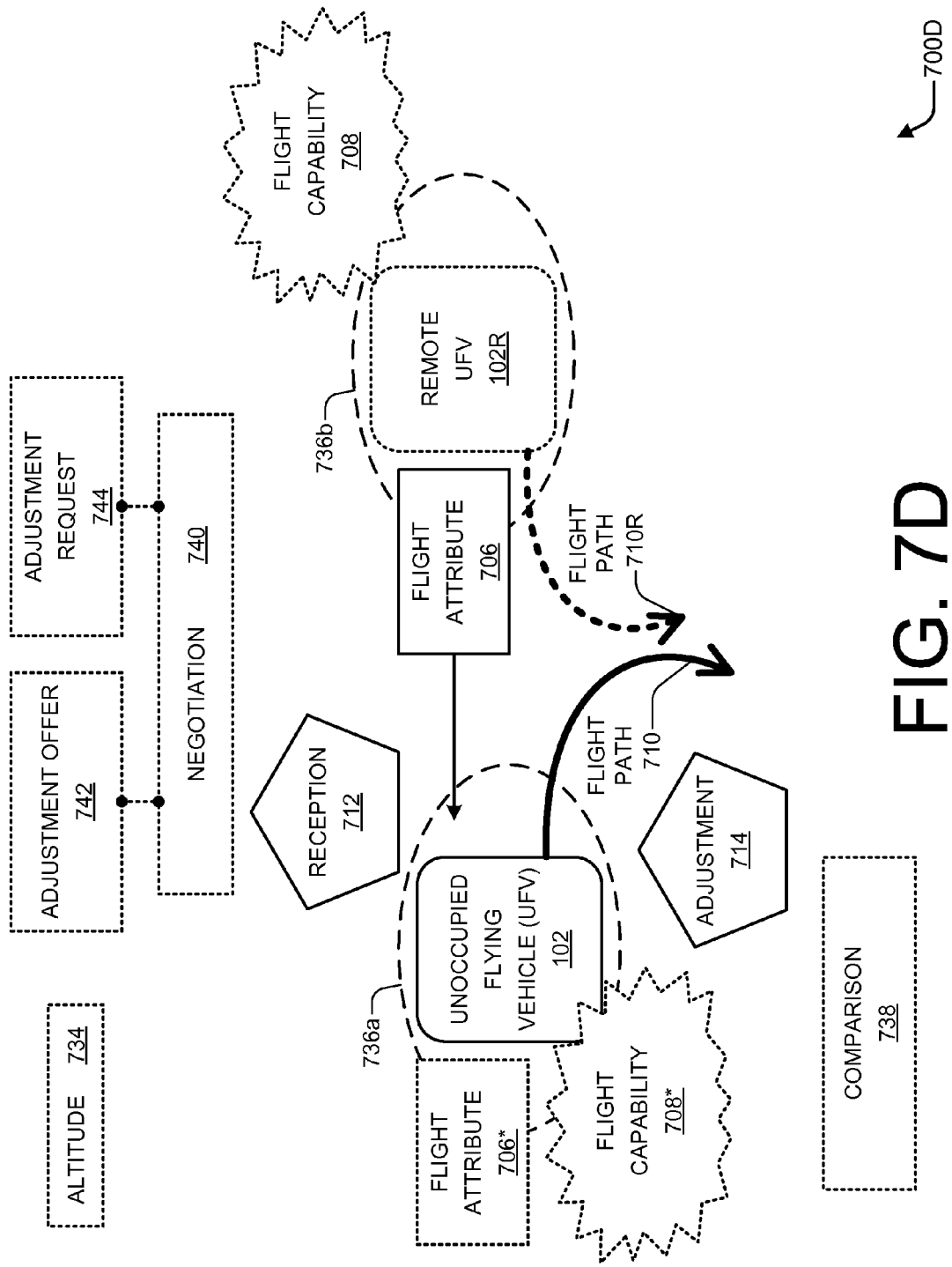

FIGS. 7B-7D are schematic diagrams 700B-700D that include at least one example machine and that depict example scenarios for implementing UFV inter-vehicle communication for hazard handling in accordance with certain example embodiments. As shown in FIGS. 7B-7D, by way of example but not limitation, one or more of schematic diagrams 700B-700D may include at least one UFV 102, at least one remote UFV 102R, at least one flight attribute 706, at least one flight capability 708, at least one flight path 710, at least one reception 712, or at least one adjustment 714. Each of schematic diagrams 700B-700D may include alternative or additional depictions, which may relate to UFV inter-vehicle communication for hazard handling, as described herein. In addition to or in alternative to description herein below with specific reference to FIGS. 7B-7D, illustrated aspects of schematic diagrams 700B-700D may be relevant to example description with reference to FIGS. 8A-8E or 9A-9C. However, claimed subject matter is not limited to any particular described embodiments, implementations, examples, etc.

As shown in FIG. 7B, by way of example but not limitation, schematic diagram 700B may include at least one UFV 102, at least one remote UFV 102R, at least one flight attribute 706, at least one flight capability 708, at least one flight path 710, at least one reception 712, or at least one adjustment 714. For certain example embodiments, a flight attribute 706 may comprise or include at least one flight capability 708, at least one flight characteristic (not shown in FIG. 7B), some combination thereof, and so forth. For certain example embodiments, a flight capability 708 may comprise or include a description of a flight performance ability, a permissible maneuverability aggressiveness level, a maximum acceleration, a safe velocity range, an aircraft type, restrictions on an ability to change altitude, some combination thereof, or so forth. For certain example embodiments, at least one flight attribute 706 may be communicated from remote UFV 102R via at least one transmission 308T (e.g., of FIG. 3C). However, claimed subject matter is not limited to any particular described embodiments, implementations, examples, etc.

For certain example embodiments, a UFV 102 may receive at least one flight attribute 706 as at least part of a reception 712, which may be or may comprise an example of at least part of a reception 308R (e.g., of FIG. 3C). For certain example implementations, a flight attribute reception module 702 (e.g., of FIG. 7A) may effectuate at least part of a reception 712. For certain example embodiments, based at least partially on at least one flight attribute 706, a UFV 102 may make an adjustment 714 to a flight path 710 of UFV 102. For certain example implementations, a flight path adjustment module 704 (e.g., of FIG. 7A) may effectuate at least part of an adjustment 714. However, claimed subject matter is not limited to any particular described embodiments, implementations, examples, etc. Additional or alternative description that may be relevant to schematic diagram 700B is provided herein below with particular reference to one or more of any of FIGS. 8A-8E or FIGS. 9A-9C.

As shown in FIG. 7C, by way of example but not limitation, schematic diagram 700C may include at least one UFV 102, at least one remote UFV 102R, at least one flight attribute 706, at least one flight capability 708, at least one flight path 710, at least one reception 712, at least one adjustment 714, at least one wireless signal 716, at least one flight attribute request 718, at least one flight attribute announcement procedure 720, at least one acceleration indicator 722, at least one turning indicator 724, at least one velocity indicator 726, at least one hover indicator 728, at least one maneuverability indicator 730, or at least one remaining available airtime 732. However, claimed subject matter is not limited to any particular described embodiments, implementations, examples, etc. Additional or alternative description that may be relevant to schematic diagram 700C is provided herein below with particular reference to one or more of any of FIGS. 8A-8E or FIGS. 9A-9C.

As shown in FIG. 7D, by way of example but not limitation, schematic diagram 700D may include at least one UFV 102, at least one remote UFV 102R, at least one flight attribute 706, at least one flight attribute 706* (of a UFV 102), at least one flight capability 708, at least one flight capability 708* (of a UFV 102), at least one flight path 710, at least one flight path 710R (of a remote UFV 102R), at least one reception 712, at least one adjustment 714, at least one altitude 734, at least one flight bubble 736 (e.g., a flight bubble 736a or a flight bubble 736b), at least one comparison 738, at least one negotiation 740, at least one adjustment offer 742, or at least one adjustment request 744. However, claimed subject matter is not limited to any particular described embodiments, implementations, examples, etc. Additional or alternative description that may be relevant to schematic diagram 700D is provided herein below with particular reference to one or more of any of FIGS. 8A-8E or FIGS. 9A-9C.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
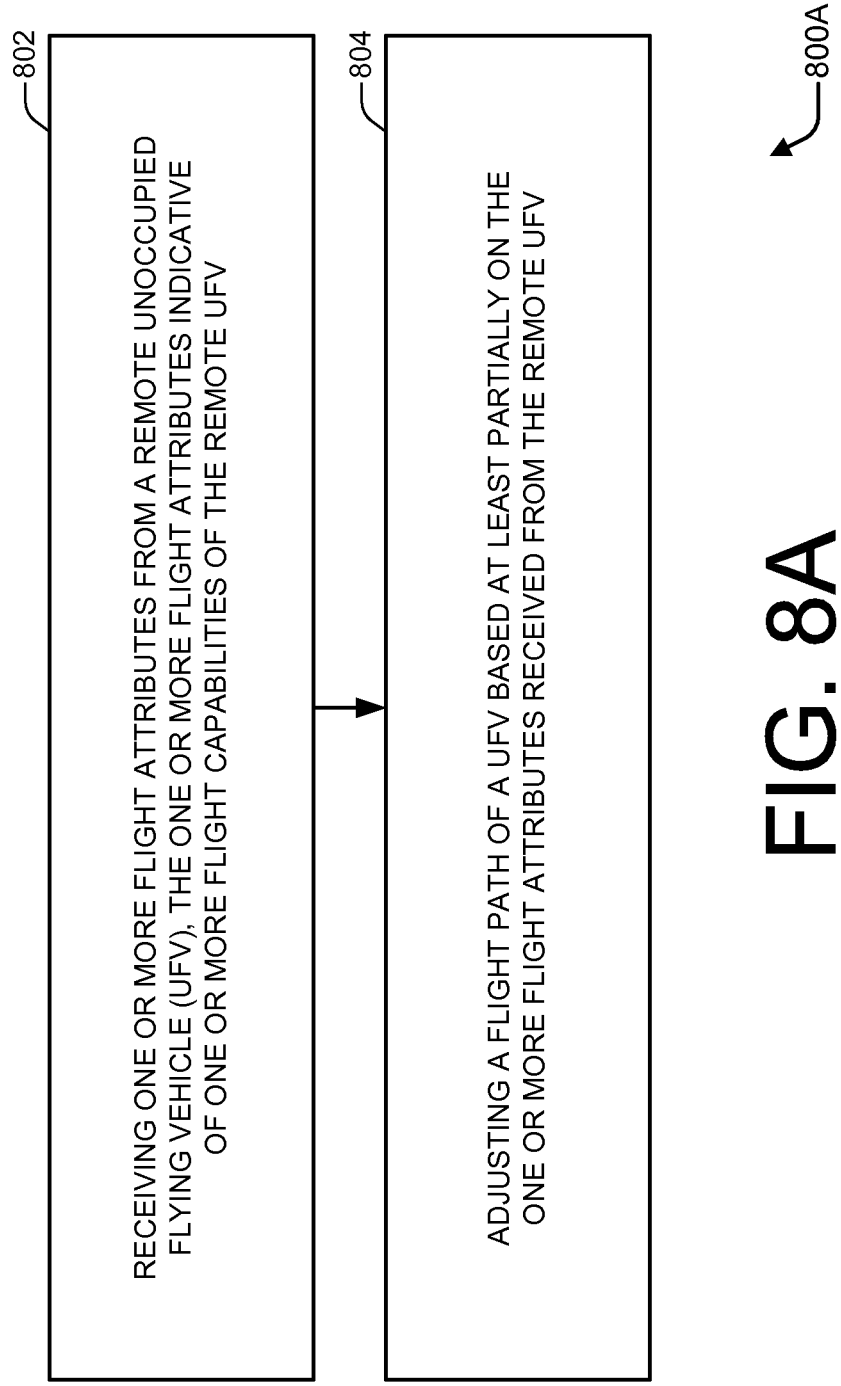
FIG. 8A is a flow diagram illustrating an example method for at least one machine with regard to UFV inter-vehicle communication for hazard handling in accordance with certain example embodiments.

FIG. 8A is a flow diagram 800A illustrating an example method for at least one machine with regard to UFV inter-vehicle communication for hazard handling in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation (s). For certain example embodiments, one or more operations of flow diagram 800A may be performed by at least one machine (e.g., a UFV 102 or at least a portion thereof).

For certain example embodiments, a method for hazard handling for an unoccupied flying vehicle (UFV) (e.g., that includes, involves, addresses, reacts to, or a combination thereof, etc. or other otherwise handles at least one remote UFV 102R, at least one POFV 302, at least one other object that may present a collision risk, at least one weather-related condition, at least one obstacle to a mission objective, at least one hindrance to accomplishing a task, at least one delay to achieving a goal, or a combination thereof, etc.) of a machine such as a UFV, may include an operation 802 or an operation 804. An operation 802 may be directed at least partially to receiving one or more flight attributes from a remote UFV, the one or more flight attributes indicative of one or more flight capabilities of the remote UFV. For certain example implementations, at least one machine may receive (e.g., accept, decode, demodulate, down-convert, detect, obtain from or via a communication, or a combination thereof, etc. via at least one reception 712) one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) from a remote UFV 102R, with one or more flight attributes 706 indicative of (e.g., representative of, descriptive of, identifying directly or indirectly, signifying, designating, expressing, or a combination thereof, etc.) one or more flight capabilities 708 (e.g., indication of flying capabilities, a specified flight performance ability, identification of craft or operator, description of flight purpose, an aircraft type, indication of what is achievable in contrast with what may be currently occurring, altitude restrictions, a safe acceleration level, weather constraints, payload, or a combination thereof, etc.) of remote UFV 102R. By way of example but not limitation, at least one UFV may receive one or more flight attributes from a remote UFV, the one or more flight attributes indicative of one or more flight capabilities of the remote UFV (e.g., a local UAV may receive a communication that includes at least one determinable flight-related capability, such as a maximum safe velocity, that reflects a maneuverability limitation of a remote UAV that is in the air). However, claimed subject matter is not limited to any particular described embodiments, implementations, examples, etc.

For certain example embodiments, an operation 804 may be directed at least partially to adjusting a flight path of a UFV based at least partially on the one or more flight attributes received from the remote UFV. For certain example implementations, at least one machine may adjust (e.g., change, decrease, increase, replace, cause a deviation in, adapt, modify, alter, add something to, take something away from, or a combination thereof, etc. via at least one adjustment 714) a flight path 710 (e.g., a heading, a flight trajectory, a position, an altitude, a speed, a direction a velocity, an acceleration, a stability level, a destination, a course through air or space or a time at which the course is to be traversed, a flight path 312, or a combination thereof, etc.) of a UFV 102 based at least partially on one or more flight attributes 706 received from a remote UFV 102R. By way of example but not limitation, at least one UFV may adjust a flight path of a UFV based at least partially on the one or more flight attributes received from the remote UFV (e.g., a local UAV may change its flight trajectory to avoid a potential collision with a remote UAV that is also flying in the air by accounting for a received determinable flight-related capability that reflects a flight imitation of the remote UAV, such as a minimum turning radius). However, claimed subject matter is not limited to any particular described embodiments, implementations, examples, etc.

FIGS. 8B-8E depict example additions or alternatives for a flow diagram of FIG. 8A in accordance with certain example embodiments. As illustrated, flow diagrams of FIGS. 8B-8E may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8E may be performed so as to be fully or partially overlapping with other operation(s). For certain example embodiments, one or more operations of flow diagrams 800B-800E (of FIGS. 8B-8E) may be performed by at least one machine (e.g., a UFV 102 or at least a portion thereof).

Figure 8B:
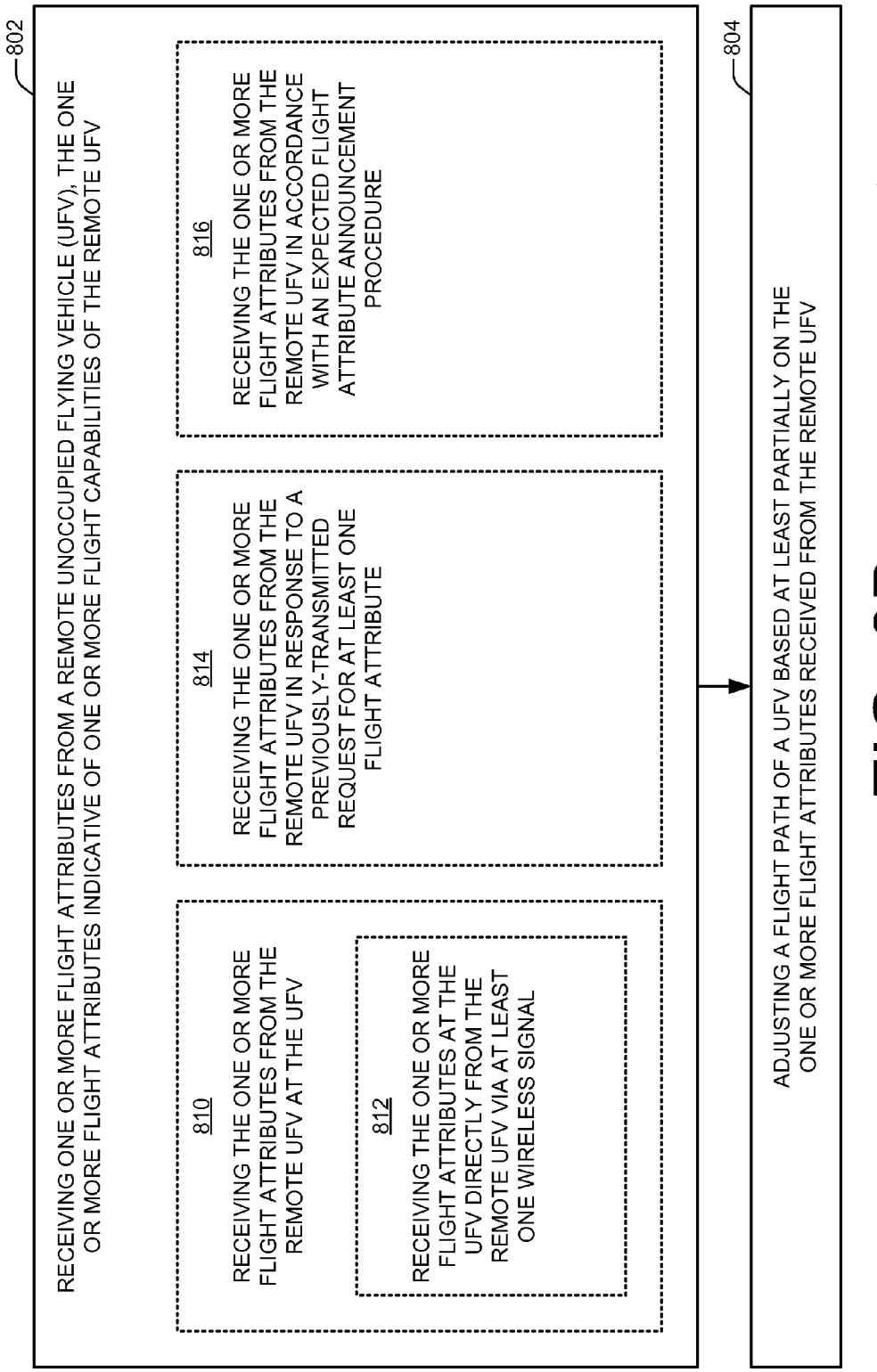
FIGS. 8B-8E depict example additions or alternatives for a flow diagram of FIG. 8A in accordance with certain example embodiments.

FIG. 8B illustrates a flow diagram 800B having example operations 810, 812, 814, or 816. For certain example embodiments, an operation 810 may be directed at least partially to wherein the receiving one or more flight attributes from a remote UFV, the one or more flight attributes indicative of one or more flight capabilities of the remote UFV, (of operation 802) includes receiving the one or more flight attributes from the remote UFV at the UFV. For certain example implementations, at least one machine may receive one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) from a remote UFV 102R at a UFV 102. By way of example but not limitation, at least one UFV may receive the one or more flight attributes from the remote UFV at the UFV (e.g., a local UAV may receive a minimum safe speed of a remote UAV from the remote UAV). However, claimed subject matter is not limited to any particular described embodiments, implementations, examples, etc.

For certain example embodiments, an operation 812 may be directed at least partially to wherein the receiving the one or more flight attributes from the remote UFV at the UFV (of operation 810) includes receiving the one or more flight attributes at the UFV directly from the remote UFV via at least one wireless signal. For certain example implementations, at least one machine may receive one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) at a UFV 102 directly (e.g., without an intervening active device; without using a repeater; with one device or machine receiving a signal transmitted by another device or machine—including with possible signal reflections, signal attenuations, etc.; or a combination thereof; etc.) from a remote UFV 102R via at least one wireless signal 716 (e.g., a radio frequency (RF) signal, an electromagnetic transmission propagating through air or space or water, a laser beam having information encoded thereon, or a combination thereof, etc.). By way of example but not limitation, at least one UFV may receive the one or more flight attributes at the UFV directly from the remote UFV via at least one wireless signal (e.g., a local UAV may receive a permitted altitude range for a remote UAV via a received wireless radio frequency (RF) signal that emanates from the remote UAV without use of an intermediate machine or signal-repeating technology). However, claimed subject matter is not limited to any particular described embodiments, implementations, examples, etc.

For certain example embodiments, an operation 814 may be directed at least partially to wherein the receiving one or more flight attributes from a remote UFV, the one or more flight attributes indicative of one or more flight capabilities of the remote UFV, (of operation 802) includes receiving the one or more flight attributes from the remote UFV in response to a previously-transmitted request for at least one flight attribute. For certain example implementations, at least one machine may receive one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) from a remote UFV 102R in response to a previously-transmitted request (e.g., a query, an inquiry as to maximum safe speed that was sent prior to receiving a response including a maximum safe speed, an interrogation as to flight purpose or operator identity, asking for a specific flight capability, asking for flight capabilities generally, a probe, or a combination thereof, etc.) for at least one flight attribute (e.g., a flight attribute request 718). By way of example but not limitation, at least one UFV may receive the one or more flight attributes from the remote UFV in response to a previously-transmitted request for at least one flight attribute (e.g., a local UAV may receive at least one negative acceleration capability of a remote UAV from the remote UAV after having sent a request to the remote UAV asking for a rate at which the remote UAV is able to reduce its speed). However, claimed subject matter is not limited to any particular described embodiments, implementations, examples, etc.

For certain example embodiments, an operation 816 may be directed at least partially to wherein the receiving one or more flight attributes from a remote UFV, the one or more flight attributes indicative of one or more flight capabilities of the remote UFV, (of operation 802) includes receiving the one or more flight attributes from the remote UFV in accordance with an expected flight attribute announcement procedure. For certain example implementations, at least one machine may receive one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) from a remote UFV 102R in accordance with an expected (e.g., planned, predicted, predetermined, scheduled, slated, prescribed, known, agreed-upon, or a combination thereof, etc.) flight attribute announcement procedure 720 (e.g., a schedule of flight capability broadcasts, an agreed-upon or known channel for disseminating flight attributes, a mandated flight attribute beacon, a standardized broadcast for one or more prescribed flight capabilities that are to be shared, a stored or broadcast plan for sharing flight attributes, or a combination thereof, etc.). By way of example but not limitation, at least one UFV may receive the one or more flight attributes from the remote UFV in accordance with an expected flight attribute announcement procedure (e.g., a local UAV may receive a remaining airtime capability of a remote UAV from the remote UAV consistent with a flight theater announcement program or plan that orchestrates one or more UAVs associated with a flight theater to transmit one or more flight capabilities at an expected—such as a pre-scheduled—time or on an expected—such as a pre-assigned—channel, with the remaining airtime capability reflecting how much longer a craft may be in the air or in the flight theater due to fuel limitations). However, claimed subject matter is not limited to any particular described embodiments, implementations, examples, etc.

Figure 8C:
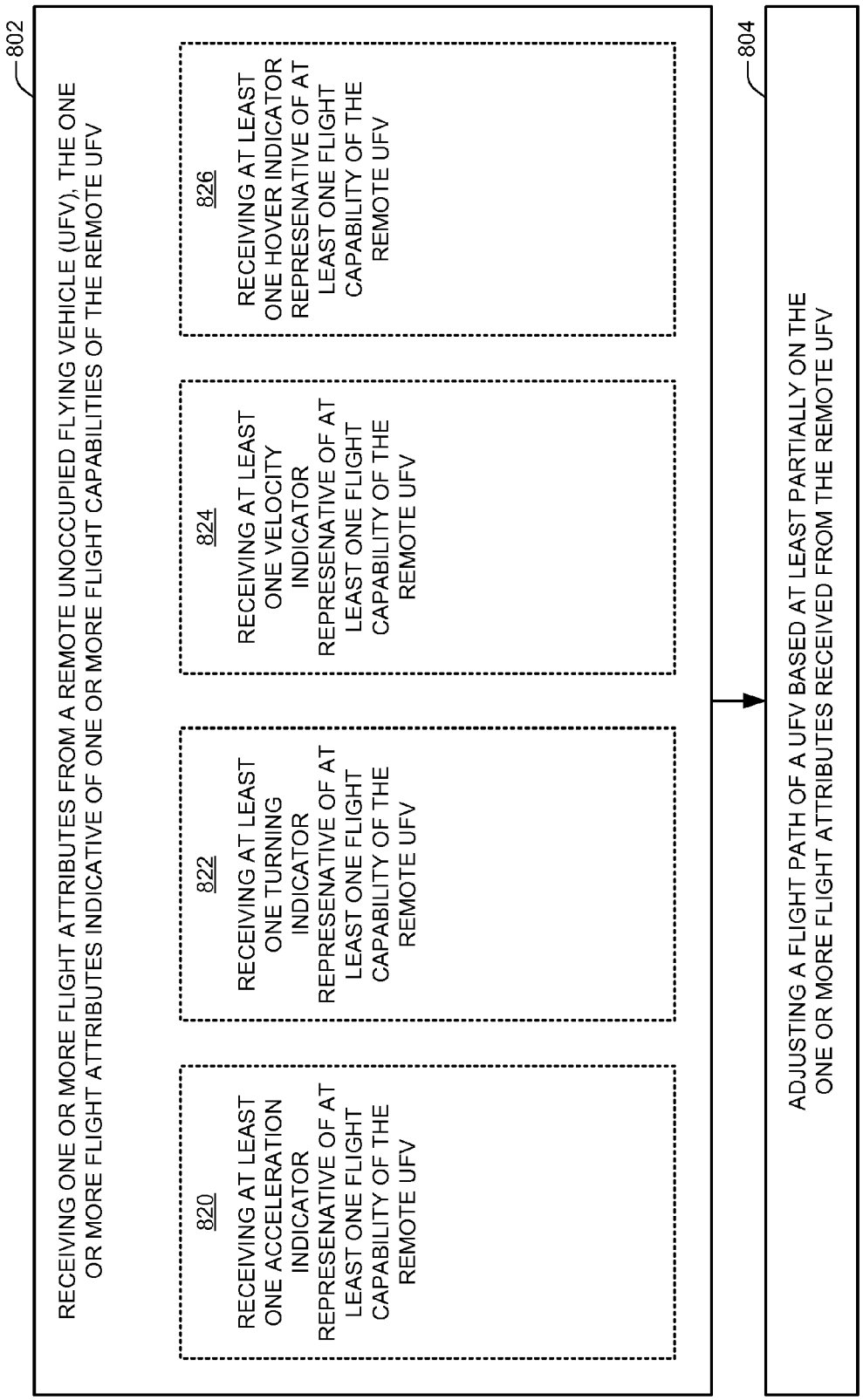

FIG. 8C illustrates a flow diagram 800C having example operations 820, 822, 824, or 826. For certain example embodiments, an operation 820 may be directed at least partially to wherein the receiving one or more flight attributes from a remote UFV, the one or more flight attributes indicative of one or more flight capabilities of the remote UFV, (of operation 802) includes receiving at least one acceleration indicator representative of at least one flight capability of the remote UFV. For certain example implementations, at least one machine may receive at least one acceleration indicator 722 (e.g., a recommended sustained acceleration, a maximum acceleration as per a manufacturer's spec sheet, a reliable directional acceleration envelope, a feasible speed acceleration, an acceleration range, a designated acceleration level in accordance with a given set of operational parameters, an acceleration given current weather conditions, or a combination thereof, etc.) representative of at least one flight capability 708 of a remote UFV 102R. By way of example but not limitation, at least one UFV may receive at least one acceleration indicator representative of at least one flight capability of the remote UFV (e.g., a local UAV may receive from a remote UAV a maximum speed acceleration possible by the remote UAV). However, claimed subject matter is not limited to any particular described embodiments, implementations, examples, etc.

For certain example embodiments, an operation 822 may be directed at least partially to wherein the receiving one or more flight attributes from a remote UFV, the one or more flight attributes indicative of one or more flight capabilities of the remote UFV, (of operation 802) includes receiving at least one turning indicator representative of at least one flight capability of the remote UFV. For certain example implementations, at least one machine may receive at least one turning indicator 724 (e.g., an indication of an ability to change direction, a turning radius, a recommended horizontal—left or right—turning ability, a vertical—up or down—turning ability, a minimum turning radius as per a manufacturer's spec sheet, a reliable turning capacity at a given speed, a feasible turning radius, a turning capacity range, a turning ability as affected by proximate obstacles, a capacity to implement a directional change given current weather conditions, or a combination thereof, etc.) representative of at least one flight capability 708 of a remote UFV 102R. By way of example but not limitation, at least one UFV may receive at least one turning indicator representative of at least one flight capability of the remote UFV (e.g., a local UAV may receive from a remote UAV a turning radius of 50 feet for the remote UAV). However, claimed subject matter is not limited to any particular described embodiments, implementations, examples, etc.

For certain example embodiments, an operation 824 may be directed at least partially to wherein the receiving one or more flight attributes from a remote UFV, the one or more flight attributes indicative of one or more flight capabilities of the remote UFV, (of operation 802) includes receiving at least one velocity indicator representative of at least one flight capability of the remote UFV. For certain example implementations, at least one machine may receive at least one velocity indicator 726 (e.g., a recommended sustained velocity as per a manufacturer's spec sheet, a maximum burst or temporary velocity, a feasible velocity given prevailing winds, a velocity range, a designated permissible velocity level in accordance with a given set of operational parameters currently guiding the UFV, a safe velocity given current weather conditions, a minimum safe velocity to avoid stalls, or a combination thereof, etc.) representative of at least one flight capability 708 of a remote UFV 102R. By way of example but not limitation, at least one UFV may receive at least one velocity indicator representative of at least one flight capability of the remote UFV (e.g., a local UAV may receive from a remote UAV a minimum safe speed possible by the remote UAV or a maximum feasible velocity given current weather conditions if the remote UAV is asked to climb 100 meters over the next 15 seconds). However, claimed subject matter is not limited to any particular described embodiments, implementations, examples, etc.

For certain example embodiments, an operation 826 may be directed at least partially to wherein the receiving one or more flight attributes from a remote UFV, the one or more flight attributes indicative of one or more flight capabilities of the remote UFV, (of operation 802) includes receiving at least one hover indicator representative of at least one flight capability of the remote UFV. For certain example implementations, at least one machine may receive at least one hover indicator 728 (e.g., an indication of whether a UFV can remain in one location, an indication of whether a UFV is capable of remaining over one geographical position, an indication of whether a UFV may remain airborne while not experiencing any forward or backward motion, a range indicating how small of a space a UFV may be self-contained within given current weather conditions, or a combination thereof, etc.) representative of at least one flight capability 708 of a remote UFV 102R. By way of example but not limitation, at least one UFV may receive at least one hover indicator representative of at least one flight capability of the remote UFV (e.g., a local UAV may receive from a remote UAV a yes/no indication of whether it is possible for the remote UAV to hover in place without appreciably changing position). However, claimed subject matter is not limited to any particular described embodiments, implementations, examples, etc.

Figure 8D:
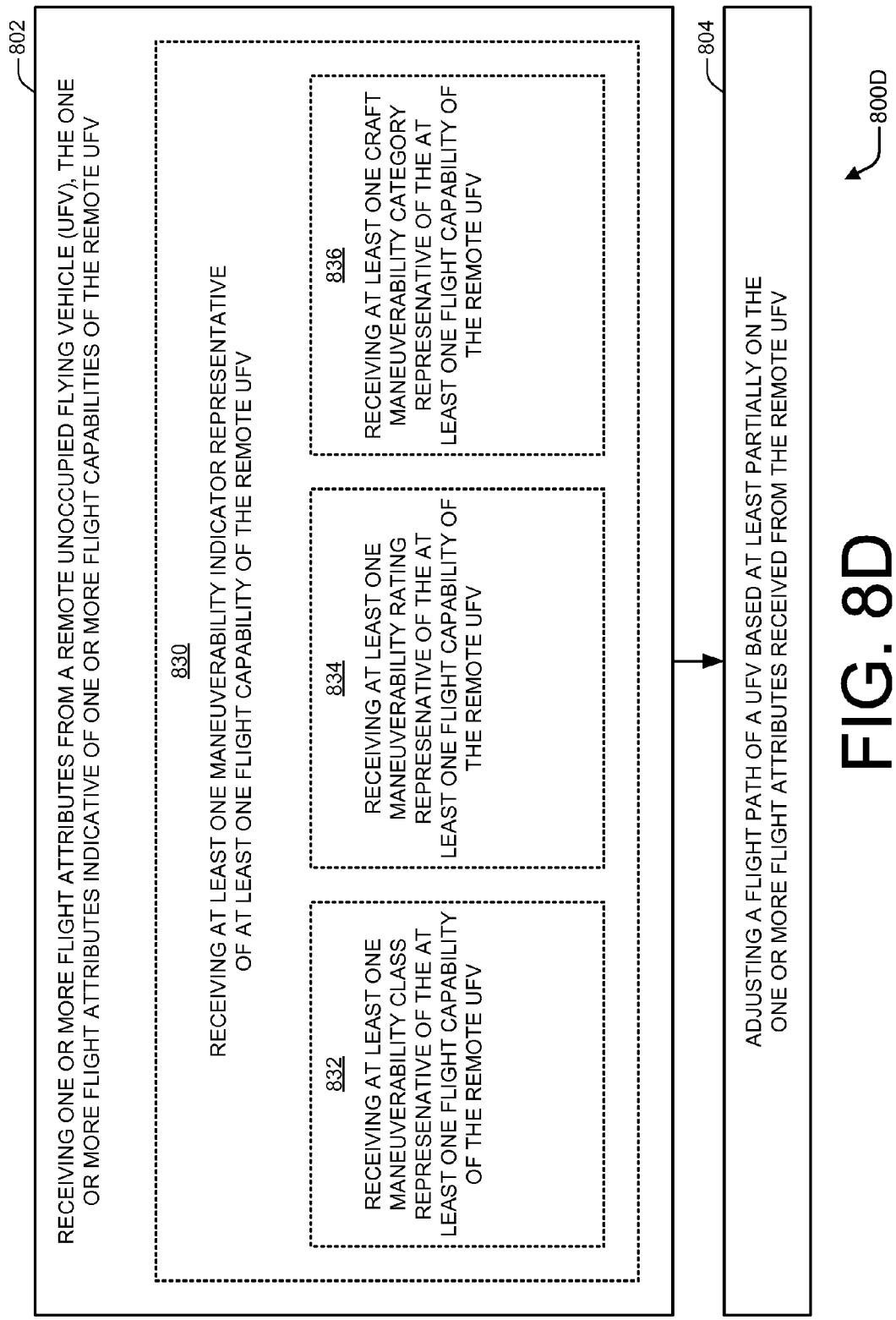

FIG. 8D illustrates a flow diagram 800D having example operations 830, 832, 834, or 836. For certain example embodiments, an operation 830 may be directed at least partially to wherein the receiving one or more flight attributes from a remote UFV, the one or more flight attributes indicative of one or more flight capabilities of the remote UFV, (of operation 802) includes receiving at least one maneuverability indicator representative of at least one flight capability of the remote UFV. For certain example implementations, at least one machine may receive at least one maneuverability indicator 730 (e.g., a label or value representative of how well a UFV can adjust its flight path, a relative indication, an absolute indication, a score, a class, a rating, a level, an indication of a degree to which a vehicle is agile, or a combination thereof, etc.) representative of at least one flight capability 708 of a remote UFV 102R. By way of example but not limitation, at least one UFV may receive at least one maneuverability indicator representative of at least one flight capability of the remote UFV (e.g., a local UAV may receive from a remote UAV an indication of how quickly the remote UAV can adjust its flight path relative to one or more other UFVs). However, claimed subject matter is not limited to any particular described embodiments, implementations, examples, etc.

For certain example embodiments, an operation 832 may be directed at least partially to wherein the receiving at least one maneuverability indicator representative of at least one flight capability of the remote UFV (of operation 830) includes receiving at least one maneuverability class representative of the at least one flight capability of the remote UFV. For certain example implementations, at least one machine may receive at least one maneuverability class (e.g., a regulatory certification for meeting at least one predetermined maneuverability criterion—such as hovering, acceleration, minimum velocity, stability in particular weather conditions, or a combination thereof, etc.; comportment with a set of construction or feature regulations for a craft type; a label equating to a set of minimal standards to achieve the label; or some combination thereof; etc.) representative of at least one flight capability 708 of a remote UFV 102R. By way of example but not limitation, at least one UFV may receive at least one maneuverability class representative of the at least one flight capability of the remote UFV (e.g., a local UAV may receive from a remote UAV a "Type IIa" class label corresponding to a particular level of maneuverability of the remote UAV). However, claimed subject matter is not limited to any particular described embodiments, implementations, examples, etc.

For certain example embodiments, an operation 834 may be directed at least partially to wherein the receiving at least one maneuverability indicator representative of at least one flight capability of the remote UFV (of operation 830) includes receiving at least one maneuverability rating representative of the at least one flight capability of the remote UFV. For certain example implementations, at least one machine may receive at least one maneuverability rating (e.g., an industry certification for meeting at least one predetermined maneuverability criterion—such as hovering, acceleration, minimum velocity, stability in particular weather conditions, or a combination thereof, etc.; comportment with a set of flight capabilities; a grade representing a maneuvering score achieved by a make or model of a vehicle; a title equating to a set of minimal standards—such as a minimum negative acceleration—to achieve the title; or some combination thereof; etc.) representative of at least one flight capability 708 of a remote UFV 102R. By way of example but not limitation, at least one UFV may receive at least one maneuverability rating representative of the at least one flight capability of the remote UFV (e.g., a local UAV may receive from a remote UAV a maneuverability score of 75, on a scale of 20 to 95, corresponding to a maneuverability level of the remote UAV, which may be compared to a maneuverability score of the local UAV). However, claimed subject matter is not limited to any particular described embodiments, implementations, examples, etc.

For certain example embodiments, an operation 836 may be directed at least partially to wherein the receiving at least one maneuverability indicator representative of at least one flight capability of the remote UFV (of operation 830) includes receiving at least one craft maneuverability category representative of the at least one flight capability of the remote UFV. For certain example implementations, at least one machine may receive at least one craft maneuverability category (e.g., fixed wing, rotary wing, LTA, ornithopter, or a combination thereof, etc.) representative of at least one flight capability 708 of a remote UFV 102R. By way of example but not limitation, at least one UFV may receive at least one craft maneuverability category representative of the at least one flight capability of the remote UFV (e.g., a local UAV may receive from a remote UAV a fixed wing category corresponding to a maneuverability of the remote UAV, which may contrast with an LTA category of the local UFV). However, claimed subject matter is not limited to any particular described embodiments, implementations, examples, etc.

Figure 8E:
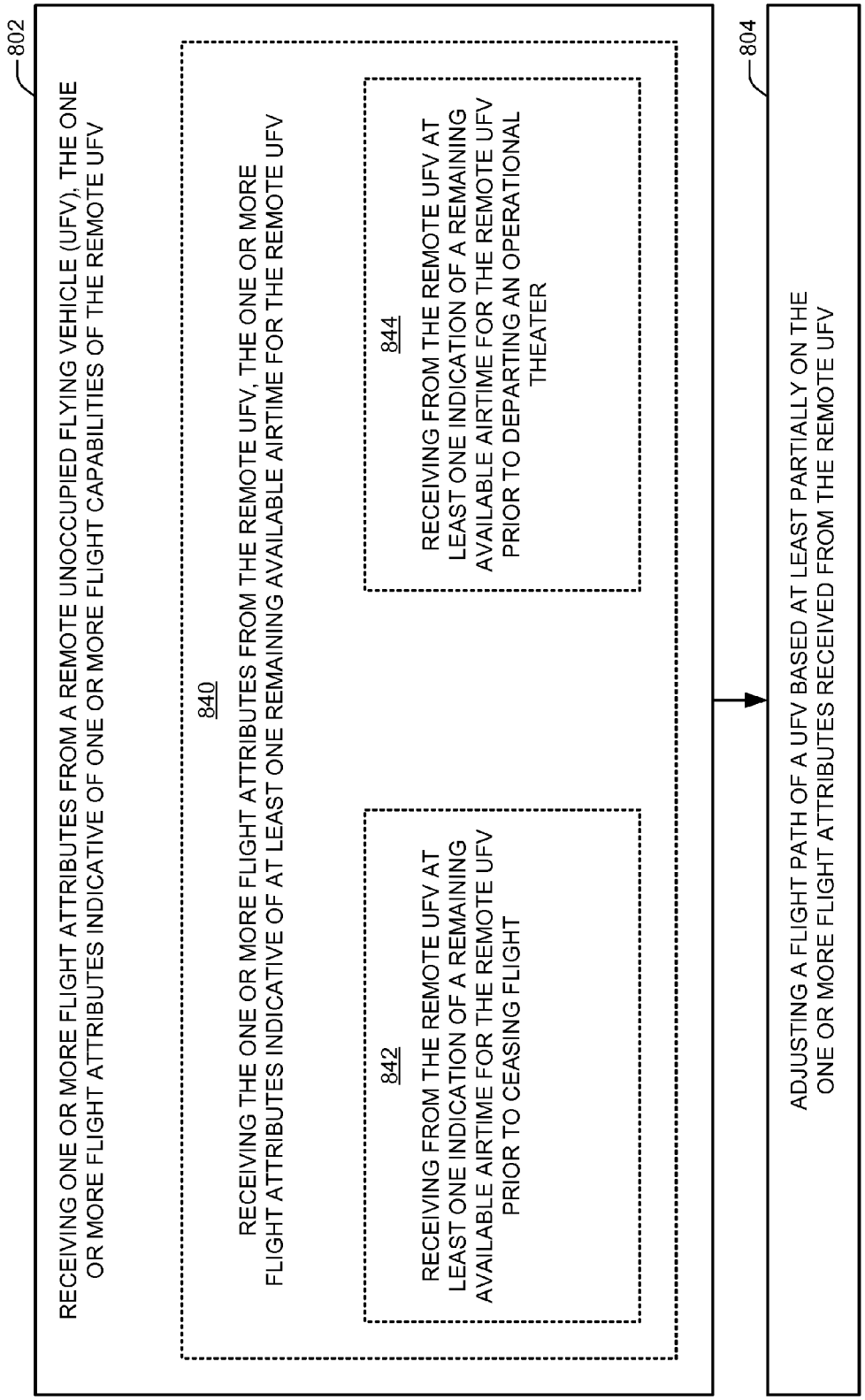

FIG. 8E illustrates a flow diagram 800E having example operations 840, 842, or 844. For certain example embodiments, an operation 840 may be directed at least partially to wherein the receiving one or more flight attributes from a remote UFV, the one or more flight attributes indicative of one or more flight capabilities of the remote UFV, (of operation 802) includes receiving the one or more flight attributes from the remote UFV, the one or more flight attributes indicative of at least one remaining available airtime for the remote UFV. For certain example implementations, at least one machine may receive one or more flight attributes 706 (e.g., indication of flying capabilities, identification of craft or operator, indication of flight path, description of flight purpose, flight trajectory, description of flying state, a specified flight performance ability, an aircraft type, altitude restrictions, a safe acceleration level, acceleration, stability, payload, destination, or a combination thereof, etc.) from a remote UFV 102R, with one or more flight attributes 706 indicative of at least one remaining available airtime 732 (e.g., a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a total amount of time flight time remaining, a total amount of time remaining minus time to land safely, a time until a vehicle will be compelled to leave a theater of operations due to insufficiency of fuel, or a combination thereof, etc.) for remote UFV 102R. By way of example but not limitation, at least one UFV may receive the one or more flight attributes from the remote UFV, with the one or more flight attributes indicative of at least one remaining available airtime for the remote UFV (e.g., a local UAV may receive from a remote UAV a flight capability indicating how much longer the remote UAV is capable of flying without refueling). However, claimed subject matter is not limited to any particular described embodiments, implementations, examples, etc.

For certain example embodiments, an operation 842 may be directed at least partially to wherein the receiving the one or more flight attributes from the remote UFV, the one or more flight attributes indicative of at least one remaining available airtime for the remote UFV, (of operation 840) includes receiving from the remote UFV at least one indication of a remaining available airtime for the remote UFV prior to ceasing flight. For certain example implementations, at least one machine may receive from a remote UFV 102R at least one indication of a remaining available airtime 732 (e.g., a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a total amount of time flight time remaining, a total amount of time remaining minus time to land safely, or a combination thereof, etc.) for remote UFV 102R prior to ceasing flight (e.g., prior to landing, before beginning to reach ground level, prior to starting a landing operation, or a combination thereof, etc.). By way of example but not limitation, at least one UFV may receive from the remote UFV at least one indication of a remaining available airtime for the remote UFV prior to ceasing flight (e.g., a local UAV may receive from a remote UAV a number of minutes that may elapse until the remote UAV will begin to descend to a safe landing area). However, claimed subject matter is not limited to any particular described embodiments, implementations, examples, etc.

For certain example embodiments, an operation 844 may be directed at least partially to wherein the receiving the one or more flight attributes from the remote UFV, the one or more flight attributes indicative of at least one remaining available airtime for the remote UFV, (of operation 840) includes receiving from the remote UFV at least one indication of a remaining available airtime for the remote UFV prior to departing an operational theater. For certain example implementations, at least one machine may receive from a remote UFV 102R at least one indication of a remaining available airtime 732 (e.g., a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a time until a vehicle will be compelled to leave a theater of operations due to insufficiency of fuel, a time until a vehicle is scheduled to exit an operational theater, or a combination thereof, etc.) for remote UFV 102R prior to departing an operational theater (e.g., a disaster area, a piece of property, an accident scene, a battlefield, a warehouse, a traffic area, a building, or a combination thereof, etc.). By way of example but not limitation, at least one UFV may receive from the remote UFV at least one indication of a remaining available airtime for the remote UFV prior to departing an operational theater (e.g., a local UAV may receive from a remote UAV a flight capability of a time range of 35-45 minutes before the remote UAV will leave an accident scene and begin heading to its base due to fuel limitations). However, claimed subject matter is not limited to any particular described embodiments, implementations, examples, etc.

Figure 9A:
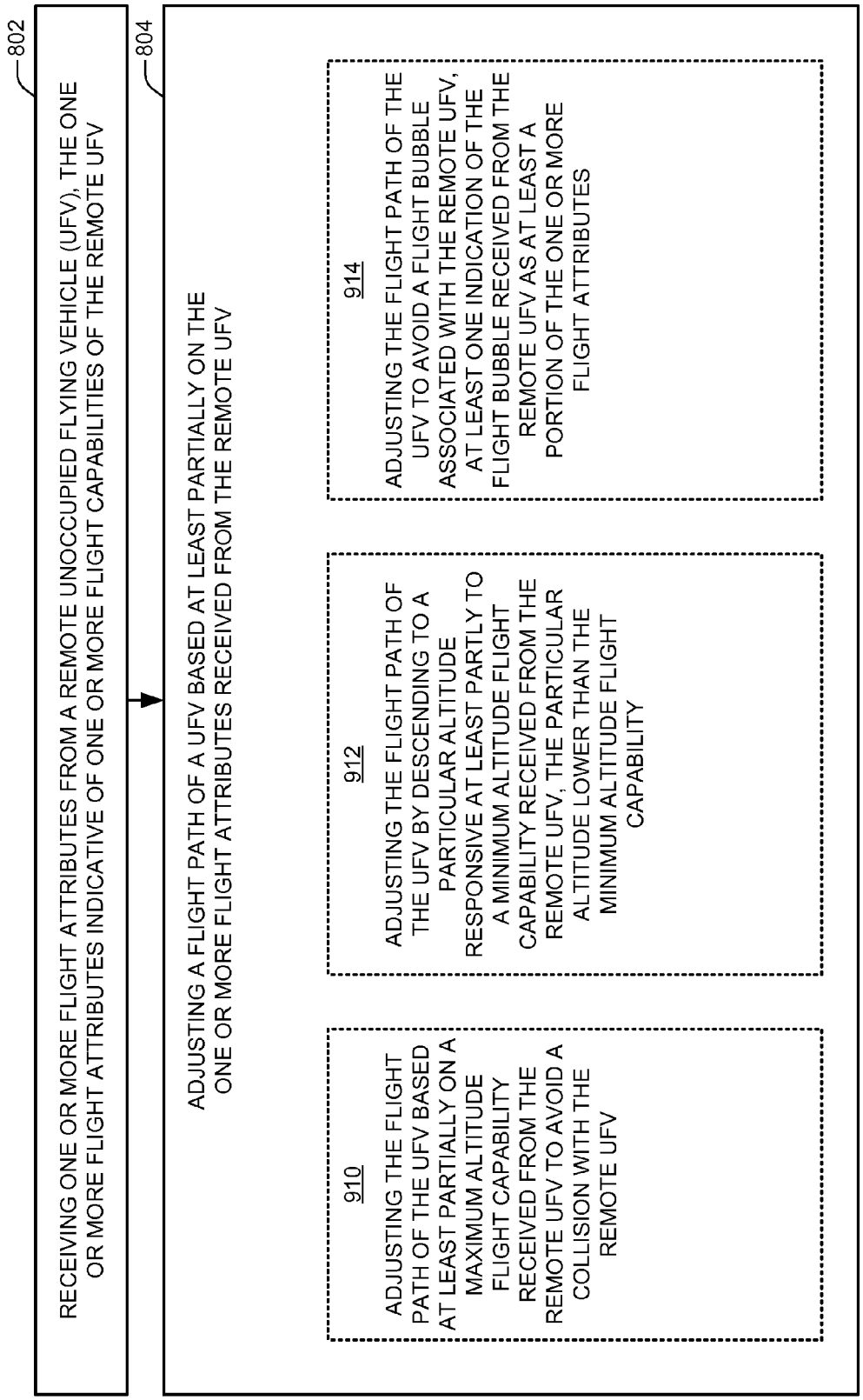

FIGS. 9A-9C depict example additions or alternatives for a flow diagram of FIG. 8A in accordance with certain example embodiments. As illustrated, flow diagrams of FIGS. 9A-9C may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9C may be performed so as to be fully or partially overlapping with other operation(s). For certain example embodiments, one or more operations of flow diagrams 900A-900C (of FIGS. 9A-9C) may be performed by at least one machine (e.g., a UFV 102 or at least a portion thereof).

FIG. 9A illustrates a flow diagram 900A having example operations 910, 912, or 914. For certain example embodiments, an operation 910 may be directed at least partially to wherein the adjusting a flight path of a UFV based at least partially on the one or more flight attributes received from the remote UFV (of operation 804) includes adjusting the flight path of the UFV based at least partially on a maximum altitude flight capability received from the remote UFV to avoid a collision with the remote UFV. For certain example implementations, at least one machine may adjust a flight path 710 of a UFV 102 based at least partially on a maximum (e.g., greatest number, highest numerical range, upper limitation, mechanically-determined limit, governmental or regulatory determined limit, value that is part of a manufacturer's specification but omits an actual limit for safety tolerance, or a combination thereof, etc.) altitude 734 (e.g., a height about ground, a height above sea level, an elevation, one or more altimeter readings, a vertical elevation above a surface, or a combination thereof, etc.) flight capability 708 received from a remote UFV 102R to avoid a collision (e.g., contact between or among two or more vehicles, a crash, a physical impact, or a combination thereof, etc.) with remote UFV 102R. By way of example but not limitation, at least one UFV may adjust the flight path of the UFV based at least partially on a maximum altitude flight capability received from the remote UFV to avoid a collision with the remote UFV (e.g., a local UAV may decrease velocity or ascend in altitude at least partly responsive to learning, via a received flight capability, that a remote UAV cannot climb any farther due to mechanical limitations of the remote craft). However, claimed subject matter is not limited to any particular described embodiments, implementations, examples, etc.

For certain example embodiments, an operation 912 may be directed at least partially to wherein the adjusting a flight path of a UFV based at least partially on the one or more flight attributes received from the remote UFV (of operation 804) includes adjusting the flight path of the UFV by descending to a particular altitude responsive at least partly to a minimum altitude flight capability received from the remote UFV, the particular altitude lower than the minimum altitude flight capability. For certain example implementations, at least one machine may adjust a flight path 710 of a UFV 102 by descending (e.g., reducing, lowering, decreasing, coasting downward, or a combination thereof, etc.) to a particular altitude 734 (e.g., a height about ground, a height above sea level, an elevation, one or more altimeter readings, a vertical elevation above a surface, or a combination thereof, etc.) responsive at least partly to a minimum (e.g., least number, lowest numerical range, lower limitation, mechanically-determined limit, governmental or regulatory determined limit, value that is part of a manufacturer's specification but omits an actual limit for safety tolerance, a number that is dependent on geographical position, or a combination thereof, etc.) altitude 734 flight capability 708 received from a remote UFV 102R, with the particular altitude lower than the minimum altitude 734 flight capability 708. By way of example but not limitation, at least one UFV may adjust the flight path of the UFV by descending to a particular altitude responsive at least partly to a minimum altitude flight capability received from the remote UFV, with the particular altitude lower than the minimum altitude flight capability (e.g., a local UAV may descend in altitude to a level that is below a minimum altitude applicable to a remote UFV due to governmental regulations affecting a craft type of the remote UFV but not a craft type of the local UAV, with the local UAV receiving a minimum altitude indication of 5,000 feet as a flight capability from the remote UFV). However, claimed subject matter is not limited to any particular described embodiments, implementations, examples, etc.

For certain example embodiments, an operation 914 may be directed at least partially to wherein the adjusting a flight path of a UFV based at least partially on the one or more flight attributes received from the remote UFV (of operation 804) includes adjusting the flight path of the UFV to avoid a flight bubble associated with the remote UFV, at least one indication of the flight bubble received from the remote UFV as at least a portion of the one or more flight attributes. For certain example implementations, at least one machine may adjust a flight path 710 of a UFV 102 to avoid (e.g., avoid contact, such as touching, overlapping in space, conflicting with, entering, impacting, or a combination thereof, etc. with UFV 102 or a flight bubble 736a thereof) a flight bubble 736b (e.g., at least one buffer zone, a shape defined by one or more distances extending from a UFV in one or more different directions, a margin of safety around, an extended area that is to be kept free of objects to facilitate safe flight by a UFV, or a combination thereof, etc.) associated with a remote UFV 102R, with at least one indication (e.g., a label representing a standardized classification of flight bubbles, a number representing a minimum distance around a UFV, a shape of a flight bubble, a description of a spatial zone, or a combination thereof, etc.) of flight bubble 736b received from remote UFV 102R as at least a portion of one or more flight attributes 706. By way of example but not limitation, at least one UFV may adjust the flight path of the UFV to avoid a flight bubble associated with the remote UFV, at least one indication of the flight bubble received from the remote UFV as at least a portion of the one or more flight attributes (e.g., a local UAV may accelerate and turn right to keep from entering a buffer zone around a remote UFV, with a size or shape of the buffer zone received from the remote UAV). However, claimed subject matter is not limited to any particular described embodiments, implementations, examples, etc.

FIG. 9B illustrates a flow diagram 900B having example operations 918 or 920. For certain example embodiments, an operation 918 may be directed at least partially to wherein the adjusting a flight path of a UFV based at least partially on the one or more flight attributes received from the remote UFV (of operation 804) includes adjusting the flight path of the UFV based at least partially on at least one comparison that includes at least one flight attribute of the one or more flight attributes received from the remote UFV. For certain example implementations, at least one machine may adjust a flight path 710 of a UFV 102 based at least partially on at least one comparison 738 (e.g., a determination of one or more similarities or differences, an ascertainment of coextensive aspects, a drawing of contrasts, an establishing of a correlation, a weighing or balancing, a relative analysis, or a combination thereof, etc.) that includes at least one flight attribute 706 of one or more flight attributes 706 received from a remote UFV 102R. By way of example but not limitation, at least one UFV may adjust the flight path of the UFV based at least partially on at least one comparison that includes at least one flight attribute of the one or more flight attributes received from the remote UFV (e.g., a local UAV may cease motion and hover momentarily based at least partly on a comparison involving (i) a position of a remote UAV and a braking or steering capability of the remote UAV and (ii) a location of a near-by building). However, claimed subject matter is not limited to any particular described embodiments, implementations, examples, etc.

For certain example embodiments, an operation 920 may be directed at least partially to wherein the adjusting the flight path of the UFV based at least partially on at least one comparison that includes at least one flight attribute of the one or more flight attributes received from the remote UFV (of operation 918) includes adjusting the flight path of the UFV based at least partially on at least one comparison that includes at least one flight capability received from the remote UFV and at least one flight capability of the UFV. For certain example implementations, at least one machine may adjust a flight path 710 of a UFV 102 based at least partially on at least one comparison 738 (e.g., a determination of one or more similarities or differences, an ascertainment of coextensive aspects, a drawing of contrasts, an establishing of a correlation, a weighing or balancing, a relative analysis, or a combination thereof, etc.) that includes at least one flight capability 708 received from a remote UFV 102R and at least one flight capability 708\* of UFV 102. By way of example but not limitation, at least one UFV may adjust the flight path of the UFV based at least partially on at least one comparison that includes at least one flight capability received from the remote UFV and at least one flight capability of the UFV (e.g., a local UAV may abruptly change elevation based at least partly on a comparison involving (i) a turning ability of a remote UAV and (ii) a turning ability of the local UAV). However, claimed subject matter is not limited to any particular described embodiments, implementations, examples, etc.

FIG. 9C illustrates a flow diagram 900C having example operations 924, 926, 928, or 930. For certain example embodiments, an operation 924 may be directed at least partially to wherein the adjusting a flight path of a UFV based at least partially on the one or more flight attributes received from the remote UFV (of operation 804) includes adjusting the flight path of the UFV based at least partially on at least one negotiation that includes at least the UFV and the remote UFV. For certain example implementations, at least one machine may adjust a flight path 710 of a UFV 102 based at least partially on at least one negotiation 740 (e.g., an offer and an acceptance (such as an acknowledgment), an offer to adjust a flight path and a rejection, an offer and a counter-offer, a suggestion for an alteration to a planned course, an exchange of signals, a request to adjust a flight path, a rejection of a request, an acceptance of a request, a swapping of offers or intentions or requests, or a combination thereof, etc.) that includes at least UFV 102 and a remote UFV 102R. By way of example but not limitation, at least one UFV may adjust the flight path of the UFV based at least partially on at least one negotiation that includes at least the UFV and the remote UFV (e.g., in response to accepting a request from a remote UAV to drop 50 meters of altitude to avoid flying in a same airspace altitude striation level as the remote UAV, a local UAV may adjust its flight path by decreasing its altitude by 50 meters). However, claimed subject matter is not limited to any particular described embodiments, implementations, examples, etc.

For certain example embodiments, an operation 926 may be directed at least partially to wherein the adjusting the flight path of the UFV based at least partially on at least one negotiation that includes at least the UFV and the remote UFV (of operation 924) includes transmitting to the remote UFV an offer to make an adjustment to the flight path of the UFV to avoid a potential collision based at least partially on the one or more flight capabilities of the remote UFV. For certain example implementations, at least one machine may transmit (e.g., send over a wireless medium, send a radio frequency (RF) signal, send an infrared or laser communication, or a combination thereof, etc.) to a remote UFV 102R an offer to make an adjustment 742 (e.g., a description of potential change(s) to a flight path in terms of deltas to a current flight path, a description of potential change(s) to a flight path in terms of a new flight path, one or more indications of changes to flight characteristics, a suggestion of changes that may be made, notice of changes that are to be made, or a combination thereof, etc.) to a flight path 710 of a UFV 102 to avoid a potential collision (e.g., a possible impact, a violation of a safety area around a vehicle, an incursion into a vehicle's buffer zone, contact between at least two vehicles' buffer zones, or a combination thereof, etc.) based at least partially on one or more flight capabilities 708 of remote UFV 102R. By way of example but not limitation, at least one UFV may transmit to the remote UFV an offer to make an adjustment to the flight path of the UFV to avoid a potential collision based at least partially on the one or more flight capabilities of the remote UFV (e.g., a local UAV may transmit a packetized communication to a remote UAV, with the communication including a suggestion that the local UAV accelerate from a current speed of 10 m/s to 12 m/s to avoid conflicting buffer zones around the local UAV and the remote UAV based at least partly on a remote UAV's relatively superior abilities to brake to a slower speed and relatively inferior abilities to accelerate to a faster speed). However, claimed subject matter is not limited to any particular described embodiments, implementations, examples, etc.

For certain example embodiments, an operation 928 may be directed at least partially to wherein the transmitting to the remote UFV an offer to make an adjustment to the flight path of the UFV to avoid a potential collision based at least partially on the one or more flight capabilities of the remote UFV (of operation 926) includes formulating the offer to make the adjustment to the flight path of the UFV responsive at least in part to a determination that the remote UFV is less maneuverable than the UFV based at least partially on the one or more flight capabilities of the remote UFV. For certain example implementations, at least one machine may formulate (e.g., create, populate fields, prepare, acquire parameters for, or a combination thereof, etc.) an offer to make an adjustment 742 to a flight path 710 of a UFV 102 responsive at least in part to a determination (e.g., a decision, an ascertainment, a calculation, a result of a comparative analysis, or a combination thereof, etc.) that a remote UFV 102R is less maneuverable (e.g., less capable of adjusting a flight path, less able to change current flight characteristics from a functional perspective, has a slower acceleration, has a lesser turning capability, is less able to ascend or descent in altitude, or a combination thereof, etc.) than UFV 102 based at least partially on one or more flight capabilities 708 of remote UFV 102R. By way of example but not limitation, at least one UFV may formulate the offer to make the adjustment to the flight path of the UFV responsive at least in part to a determination that the remote UFV is less maneuverable than the UFV based at least partially on the one or more flight capabilities of the remote UFV (e.g., a local UAV may prepare an offer to adjust its flight path by descending 1000 feet responsive at least partly to a determination that a remote UAV cannot descend as rapidly as the local UAV based at least partially on a craft type or an altitude change capability indicator of the remote UAV). However, claimed subject matter is not limited to any particular described embodiments, implementations, examples, etc.

For certain example embodiments, an operation 930 may be directed at least partially to wherein the adjusting the flight path of the UFV based at least partially on at least one negotiation that includes at least the UFV and the remote UFV (of operation 924) includes transmitting to the remote UFV a request to make an adjustment to a flight path of the remote UFV based at least partially on the one or more flight attributes indicative of the one or more flight capabilities of the remote UFV and at least one flight attribute of the UFV. For certain example implementations, at least one machine may transmit (e.g., send over a wireless medium, send a radio frequency (RF) signal, send an infrared or laser communication, or a combination thereof, etc.) to a remote UFV 102R a request to make an adjustment 744 (e.g., a description of potential change(s) to a flight path in terms of deltas to a current flight path, a description of potential change(s) to a flight path in terms of a new flight path, one or more indications of optional changes to flight characteristics—such as a different velocity or an increased acceleration, a suggestion of changes that may be made, or a combination thereof, etc.) to a flight path 710R of remote UFV 102R based at least partially on one or more flight attributes 706 indicative of one or more flight capabilities 708 of remote UFV 102R and at least one flight attribute 706* of UFV 102. By way of example but not limitation, at least one UFV may transmit to the remote UFV a request to make an adjustment to a flight path of the remote UFV based at least partially on the one or more flight attributes indicative of the one or more flight capabilities of the remote UFV and at least one flight attribute of the UFV (e.g., a local UAV may send to a remote UAV a communication formulated in accordance with an inter-UAV navigational coordination standard that asks the remote UAV to turn to a heading of thirty degrees west of north based at least partly on an analysis including their respective current flight paths plus a flight characteristic of the remote UAV that results in a prediction that the remote UAV has turning capabilities sufficient to effectuate the requesting heading in time to avoid conflict between a buffer zone of the local UAV and a buffer zone of the remote UAV if the local UAV also negatively accelerates in accordance with a known flight attribute of the local UAV). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or nonvolatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An unoccupied flying vehicle (UFV) comprising:
    one or more electronic devices configured for autonomously controlling the UFV, the one or more electronic devices including at least:
        circuitry configured for obtaining at least one indication of at least one hazard associated with at least one mission including at least the UFV and at least one remote UFV;
        circuitry configured for autonomously analyzing the at least one indication of at least one hazard associated with at least one mission including at least the UFV and at least one remote UFV;
        circuitry configured for autonomously formulating at least one request for one or more flight attributes indicative of one or more flight capabilities of the at least one remote UFV based at least partially on the autonomous analysis of the at least one indication of at least one hazard associated with at least one mission including at least the UFV and at least one remote UFV;
        circuitry configured for sending the autonomously formulated at least one request for one or more flight attributes indicative of one or more flight capabilities of the at least one remote UFV;
        circuitry configured for receiving the one or more flight attributes indicative of one or more flight capabilities of the at least one remote UFV transmitted in response to the at least one request;
        circuitry configured for determining at least one flight path adjustment corresponding to the at least one mission including the UFV and at least one remote UFV based at least partially on the received one or more flight attributes and based at least partially on the autonomous analysis of the at least one indication of at least one hazard associated with at least one mission including at least the UFV and at least one remote UFV; and
        circuitry configured for adjusting at least one flight path of at least the UFV based at least partially on the determined at least one flight path adjustment.

2. The UFV of claim 1, wherein the circuitry configured for receiving the one or more flight attributes indicative of one or more flight capabilities of the at least one remote UFV transmitted in response to the at least one request comprises:
    at least one of
        circuitry configured for receiving from the at least one remote UFV the one or more flight attributes indicative of one or more flight capabilities of the at least one remote UFV at the UFV;
        circuitry configured for receiving from at least one base station the one or more flight attributes indicative of one or more flight capabilities of the at least one remote UFV at the UFV;

circuitry configured for receiving the one or more flight attributes indicative of one or more flight capabilities of the at least one remote UFV at the UFV directly from the at least one remote UFV via at least one wireless signal; or circuitry configured for receiving the one or more flight attributes indicative of one or more flight capabilities of the at least one remote UFV at the UFV at least one of directly or indirectly from at least one base station via at least one wireless signal.

3. The UFV of claim 1, wherein the circuitry configured for receiving the one or more flight attributes indicative of one or more flight capabilities of the at least one remote UFV transmitted in response to the at least one request comprises:

at least one of
circuitry configured for receiving from the at least one remote UFV the one or more flight attributes indicative of one or more flight capabilities of the at least one remote UFV transmitted in response to a request for at least one flight attribute sent from the UFV to the at least one remote UFV; or circuitry configured for receiving from the at least one remote UFV the one or more flight attributes indicative of one or more flight capabilities of the at least one remote UFV transmitted in accordance with an expected performance specification announcement procedure.

4. The UFV of claim 1, wherein the circuitry configured for receiving the one or more flight attributes indicative of one or more flight capabilities of the at least one remote UFV transmitted in response to the at least one request comprises:

at least one of
circuitry configured for receiving from the at least one remote UFV at least one acceleration indicator representative of at least one performance specification associated with the at least one remote UFV;

circuitry configured for receiving from the at least one remote UFV at least one turning indicator representative of at least one performance specification associated with the at least one remote UFV;

circuitry configured for receiving from the at least one remote UFV at least one velocity indicator representative of at least one performance specification associated with the at least one remote UFV; or circuitry configured for receiving from the at least one remote UFV at least one hover indicator representative of at least one performance specification associated with the at least one remote UFV.

5. The UFV of claim 1, wherein the circuitry configured for receiving the one or more flight attributes indicative of one or more flight capabilities of the at least one remote UFV transmitted in response to the at least one request comprises:

at least one of
circuitry configured for receiving from the at least one remote UFV at least one maneuverability indicator representative of at least one performance specification associated with the at least one remote UFV;

circuitry configured for receiving from the at least one remote UFV at least one maneuverability class representative of at least one flight capability of the at least one remote UFV;

circuitry configured for receiving from the at least one remote UFV at least one maneuverability rating representative of at least one flight capability of the at least one remote UFV; or circuitry configured for receiving from the at least one remote UFV at least one maneuverability category representative of at least one flight capability of the at least one remote UFV.

6. The UFV of claim 1, wherein the circuitry configured for receiving the one or more flight attributes indicative of one or more flight capabilities of the at least one remote UFV transmitted in response to the at least one request comprises:

at least one of
circuitry configured for receiving from the at least one remote UFV at least one indication of at least one remaining available airtime for the at least one remote UFV;

circuitry configured for receiving from the at least one remote UFV at least one indication of at least one remaining available airtime for the at least one remote UFV prior to flight cessation; or circuitry configured for receiving from the at least one remote UFV at least one indication of at least one remaining available airtime for the at least one remote UFV prior to departure from an operational theater.

7. The UFV of claim 1, wherein the circuitry configured for determining at least one flight path adjustment corresponding to the at least one mission including at least the UFV and at least one remote UFV based at least partially on the received one or more flight attributes and based at least partially on the autonomous analysis of the at least one indication of at least one hazard associated with at least one mission including at least the UFV and at least one remote UFV comprises:

circuitry configured for determining at least one flight path adjustment corresponding to the at least one mission including at least the UFV and at least one remote UFV to avoid a collision of the UFV with the at least one remote UFV.

8. The UFV of claim 1, wherein the circuitry configured for determining at least one flight path adjustment corresponding to the at least one mission including at least the UFV and at least one remote UFV based at least partially on the received one or more flight attributes and based at least partially on the autonomous analysis of the at least one indication of at least one hazard associated with at least one mission including at least the UFV and at least one remote UFV comprises:

circuitry configured for determining at least one flight path adjustment corresponding to the at least one mission including at least the UFV and at least one remote UFV including at least descending the UFV to a particular altitude responsive at least partly to a minimum altitude flight capability associated with the at least one remote UFV, the particular altitude lower than the minimum altitude flight capability.

9. The UFV of claim 1, wherein the circuitry configured for determining at least one flight path adjustment corresponding to the at least one mission including at least the UFV and at least one remote UFV based at least partially on the received one or more flight attributes and based at least partially on the autonomous analysis of the at least one indication of at least one hazard associated with at least one mission including at least the UFV and at least one remote UFV comprises:

circuitry configured for determining at least one flight path adjustment corresponding to the at least one mission including at least the UFV and at least one remote UFV to avoid a flight bubble associated with the at least one remote UFV, at least one indication of the flight bubble received as at least a portion of the one or more flight attributes.

10. The UFV of claim 1, wherein the circuitry configured for determining at least one flight path adjustment corresponding to the at least one mission including at least the UFV and at least one remote UFV based at least partially on the received one or more flight attributes and based at least partially on the autonomous analysis of the at least one indication of at least one hazard associated with at least one mission including at least the UFV and at least one remote UFV comprises:
   circuitry configured for determining at least one flight path adjustment corresponding to the at least one mission including at least the UFV and at least one remote UFV based at least partially on at least one comparison that includes at least one flight attribute of the one or more flight attributes.

11. The UFV of claim 10, wherein the circuitry configured for determining at least one flight path adjustment corresponding to the at least one mission including at least the UFV and at least one remote UFV based at least partially on at least one comparison that includes at least one flight attribute of the one or more flight attributes comprises:
   circuitry configured for determining at least one flight path adjustment corresponding to the at least one mission including at least the UFV and at least one remote UFV based at least partially on at least one comparison that includes at least one flight capability associated with the at least one remote UFV and at least one flight capability of the UFV.

12. The UFV of claim 1, wherein the circuitry configured for determining at least one flight path adjustment corresponding to the at least one mission including at least the UFV and at least one remote UFV based at least partially on the received one or more flight attributes and based at least partially on the autonomous analysis of the at least one indication of at least one hazard associated with at least one mission including at least the UFV and at least one remote UFV comprises:
   circuitry configured for determining at least one flight path adjustment corresponding to the at least one mission including at least the UFV and at least one remote UFV based at least partially on at least one negotiation that includes at least the UFV and the at least one remote UFV.

13. The UFV of claim 12, wherein the circuitry configured for determining at least one flight path adjustment corresponding to the at least one mission including at least the UFV and at least one remote UFV based at least partially on at least one negotiation that includes at least the UFV and the at least one remote UFV comprises:
   at least one of
      circuitry configured for transmitting to the at least one remote UFV at least one offer to make at least one adjustment to the flight path of the UFV to avoid a potential collision based at least partially on the one or more flight attributes; or
      circuitry configured for formulating the at least one offer to make the at least one adjustment to the flight path of the UFV responsive at least in part to a determination that the at least one remote UFV is less maneuverable than the UFV based at least partially on the one or more flight attributes.

14. The UFV of claim 12, wherein the circuitry configured for adjusting the flight path of the UFV based at least partially on at least one negotiation that includes at least the UFV and the at least one remote UFV comprises:
   circuitry configured for transmitting to the at least one remote UFV at least one request to make at least one adjustment to a flight path of the at least one remote UFV based at least partially on the one or more flight attributes and at least one performance specification of the UFV.

15. The UFV of claim 1, wherein the circuitry configured for receiving the one or more flight attributes indicative of one or more flight capabilities of the at least one remote UFV transmitted in response to the at least one request comprises:
   at least one of:
      circuitry configured for receiving from the at least one remote UFV one or more performance specifications indicating at least one flight performance that is achievable beyond a currently occurring flight performance;
      circuitry configured for receiving from the at least one remote UFV one or more performance specifications indicating at least one flight maneuverability that is achievable beyond a currently occurring flight maneuverability;
      circuitry configured for receiving from the at least one remote UFV one or more performance specifications indicating at least one acceleration that is achievable beyond a currently occurring acceleration;
      circuitry configured for receiving from the at least one remote UFV one or more performance specifications indicating at least a recommended sustained acceleration indicative of at least one sustained acceleration that is achievable beyond a currently occurring acceleration;
      circuitry configured for receiving from the at least one remote UFV one or more performance specifications indicating at least a recommended turning ability indicative of at least one turning ability that is achievable beyond a currently occurring turning ability; or
      circuitry configured for receiving from the at least one remote UFV one or more performance specifications indicating at least a recommended sustained velocity indicative of at least one sustained velocity that is achievable beyond a currently occurring velocity.

16. The UFV of claim 1, wherein the circuitry configured for sending the autonomously formulated at least one request for one or more flight attributes indicative of one or more flight capabilities of the at least one remote UFV comprises:
   circuitry configured for sending an offer to make an adjustment to the flight path of the UFV to avoid a potential collision based at least partially on one or more flight capabilities of the at least one remote UFV.

17. The UFV of claim 1, wherein the circuitry configured for sending the autonomously formulated at least one request for one or more flight attributes indicative of one or more flight capabilities of the at least one remote UFV comprises:
   circuitry configured for sending a request to the at least one remote UFV asking for one or more of an indication of flying capabilities, an identification of craft or operator, an indication of flight path, a description of flight purpose, a flight trajectory, a description of flying state, a specified flight performance ability, an aircraft type, an altitude restriction, a safe acceleration level, an acceleration, a stability, a payload, or a destination.

18. The UFV of claim 1, wherein the circuitry configured for sending the autonomously formulated at least one request for one or more flight attributes indicative of one or more flight capabilities of the at least one remote UFV comprises:
circuitry configured for sending a request to the at least one remote UFV asking for a remaining available airtime including at least an indication of one or more of a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a total amount of time flight time remaining, a total amount of time remaining minus time to land safely for the at least one remote UFV prior to ceasing flight including at least one of prior to landing, before beginning to reach ground level, prior to starting a landing operation, or a number of minutes that may elapse until the remote UFV will begin to descend to a safe landing area.

19. The UFV of claim 1, wherein the circuitry configured for sending the autonomously formulated at least one request for one or more flight attributes indicative of one or more flight capabilities of the at least one remote UFV comprises:
circuitry configured for sending a request to the at least one remote UFV in at least one negotiation exchange of requests and responses between the UFV and the at least one remote UFV.

20. The UFV of claim 1, wherein the circuitry configured for sending the autonomously formulated at least one request for one or more flight attributes indicative of one or more flight capabilities of the at least one remote UFV comprises:
circuitry configured for sending a request to the at least one remote UFV in at least one negotiated exchange of requests and responses between the UFV and the at least one remote UFV including at least one of an offer and an acceptance, an offer to adjust a flight path and a rejection, an offer and a counter-offer, a suggestion for an alteration of a planned course, an exchange of signals, a request to adjust a flight path, a rejection of a request, an acceptance of a request, a swapping of offers, intentions or requests.

21. The UFV of claim 1, further comprising:
circuitry configured for autonomously formulating at least one request to adjust the flight path for transmission to the at least one remote UFV based at least partially on the determined at least one flight path adjustment; and
circuitry configured for transmitting to the at least one remote UFV the at least one request to adjust the flight path.

22. The UFV of claim 1, wherein the circuitry configured for obtaining at least one indication of at least one hazard associated with at least one mission including at least the UFV and at least one remote UFV includes:
circuitry configured for detecting at least one indication of at least one hazard associated with at least one mission including at least the UFV and at least one remote UFV.

23. The UFV of claim 1, wherein the circuitry configured for obtaining at least one indication of at least one hazard associated with at least one mission including at least the UFV and at least one remote UFV includes:
one or more sensors configured for sensing at least one indication of at least one hazard associated with at least one mission including at least the UFV and at least one remote UFV.

24. The UFV of claim 1, wherein the circuitry configured for obtaining at least one indication of at least one hazard associated with at least one mission including at least the UFV and at least one remote UFV includes:
circuitry configured for receiving at least one indication of at least one hazard associated with at least one mission including at least the UFV and at least one remote UFV from at least one of a base station or at least one remote UFV.

25. The UFV of claim 1, wherein the circuitry configured for obtaining at least one indication of at least one hazard associated with at least one mission including at least the UFV and at least one remote UFV includes:
circuitry configured for obtaining at least one indication of at least one hazard associated with at least one mission including at least the UFV and at least one remote UFV, the at least one hazard including at least one of other unoccupied flying vehicles, occupied flying vehicles, ground, buildings, structures on ground, moving objects, weather conditions, or stationary objects.

26. The UFV of claim 1, wherein the circuitry configured for autonomously analyzing the at least one indication of at least one hazard associated with at least one mission including at least the UFV and at least one remote UFV includes:
circuitry configured for autonomously determining one or more flight control decisions based at least partially on the at least one indication of at least one hazard associated with at least one mission including at least the UFV and at least one remote UFV.

27. The UFV of claim 1, wherein the circuitry configured for autonomously analyzing the at least one indication of at least one hazard associated with at least one mission including at least the UFV and at least one remote UFV includes:
circuitry configured for autonomously analyzing the at least one indication of at least one hazard including at least one determination of a prediction associated with at least one hazard based at least partially on the at least one indication of at least one hazard associated with at least one mission including at least the UFV and at least one remote UFV.

28. The UFV of claim 1, wherein the circuitry configured for autonomously analyzing the at least one indication of at least one hazard associated with at least one mission including at least the UFV and at least one remote UFV includes:
circuitry configured for autonomously analyzing the at least one indication of at least one hazard including at least one determination of at least one of an avoidance, a management, a mitigation, a coordination, a cooperation, or an elimination associated with at least one hazard based at least partially on the at least one indication of at least one hazard associated with at least one mission including at least the UFV and at least one remote UFV.

29. The UFV of claim 1, wherein the circuitry configured for autonomously formulating at least one request for one or more flight attributes indicative of one or more flight capabilities of the at least one remote UFV based at least partially on the autonomous analysis of the at least one indication of at least one hazard associated with at least one mission including at least the UFV and at least one remote UFV includes:

circuitry configured for autonomously formulating at least one request for one or more flight attributes indicative of at least one of identification of craft or operator, indication of flight path, description of flight purpose, flight trajectory, description of flying state, a specified flight performance ability, an aircraft type, altitude restrictions, a safe acceleration level, acceleration, stability, payload, or destination of the at least one remote UFV based at least partially on the autonomous analysis of the at least one indication of at least one hazard associated with at least one mission including at least the UFV and at least one remote UFV.

30. The UFV of claim 1, wherein the circuitry configured for autonomously formulating at least one request for one or more flight attributes indicative of one or more flight capabilities of the at least one remote UFV based at least partially on the autonomous analysis of the at least one indication of at least one hazard associated with at least one mission including at least the UFV and at least one remote UFV includes:
 circuitry configured for autonomously formulating at least one request for a rate at which the at least one remote UFV is able to reduce speed based at least partially on the autonomous analysis of the at least one indication of at least one hazard associated with at least one mission including at least the UFV and at least one remote UFV.

31. The UFV of claim 1, wherein the circuitry configured for adjusting at least one flight path of at least the UFV based at least partially on the determined at least one flight path adjustment includes:
 circuitry configured for controlling at least one motility mechanism of the UFV for adjusting at least one flight path of at least the UFV based at least partially on the determined at least one flight path adjustment.

32. A method at least partially implemented by at least one machine comprising:
 autonomously controlling an unoccupied flying vehicle (UFV) including at least:
  obtaining at least one indication of at least one hazard associated with at least one mission including at least the UFV and at least one remote UFV;
  autonomously analyzing the at least one indication of at least one hazard associated with at least one mission including at least the UFV and at least one remote UFV;
  autonomously formulating at least one request for one or more flight attributes indicative of one or more flight capabilities of the at least one remote UFV based at least partially on the autonomous analysis of the at least one indication of at least one hazard associated with at least one mission including at least the UFV and at least one remote UFV;
  sending the autonomously formulated at least one request for one or more flight attributes indicative of one or more flight capabilities of the at least one remote UFV;
  receiving the one or more flight attributes indicative of one or more flight capabilities of the at least one remote UFV transmitted in response to the at least one request;
  determining at least one flight path adjustment corresponding to the at least one mission including the UFV and at least one remote UFV based at least partially on the received one or more flight attributes and based at least partially on the autonomous analysis of the at least one indication of at least one hazard associated with at least one mission including at least the UFV and at least one remote UFV; and
 adjusting at least one flight path of at least the UFV based at least partially on the determined at least one flight path adjustment.

33. A system comprising:
 means for autonomously controlling an unoccupied flying vehicle (UFV) including at least:
  means for obtaining at least one indication of at least one hazard associated with at least one mission including at least the UFV and at least one remote UFV;
  means for autonomously analyzing the at least one indication of at least one hazard associated with at least one mission including at least the UFV and at least one remote UFV;
  means for autonomously formulating at least one request for one or more flight attributes indicative of one or more flight capabilities of the at least one remote UFV based at least partially on the autonomous analysis of the at least one indication of at least one hazard associated with at least one mission including at least the UFV and at least one remote UFV;
  means for sending the autonomously formulated at least one request for one or more flight attributes indicative of one or more flight capabilities of the at least one remote UFV;
  means for receiving the one or more flight attributes indicative of one or more flight capabilities of the at least one remote UFV transmitted in response to the at least one request;
  means for determining at least one flight path adjustment corresponding to the at least one mission including the UFV and at least one remote UFV based at least partially on the received one or more flight attributes and based at least partially on the autonomous analysis of the at least one indication of at least one hazard associated with at least one mission including at least the UFV and at least one remote UFV; and
  means for adjusting at least one flight path of at least the UFV based at least partially on the determined at least one flight path adjustment.

* * * * *